United States Patent
Byrne et al.

(10) Patent No.: US 7,983,963 B2
(45) Date of Patent: Jul. 19, 2011

(54) SYSTEM, PROGRAM PRODUCT, AND METHOD OF ELECTRONIC COMMUNICATION NETWORK GUIDED NAVIGATION

(75) Inventors: Patrick Byrne, Park City, UT (US); Samuel Jacob Peterson, Orem, UT (US); Seth Allen Moore, Lehi, UT (US); Thayne Lewis, Farmington, UT (US); Geoffrey Atkinson, Salt Lake City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 255 days.

(21) Appl. No.: 12/345,453

(22) Filed: Dec. 29, 2008

(65) Prior Publication Data
US 2009/0171813 A1 Jul. 2, 2009

Related U.S. Application Data

(60) Provisional application No. 61/048,285, filed on Apr. 28, 2008, provisional application No. 61/017,500, filed on Dec. 28, 2007.

(51) Int. Cl.
*G06F 17/30* (2006.01)
(52) U.S. Cl. ......... 705/27; 705/26; 707/5; 707/E17.108; 709/223; 709/224
(58) Field of Classification Search .............. 705/26–27; 707/5, E17.108, 1; 709/223–224
See application file for complete search history.

(56) References Cited

U.S. PATENT DOCUMENTS

| 5,761,496 | A | * | 6/1998 | Hattori ........................ 707/796 |
| 5,761,662 | A | * | 6/1998 | Dasan ................................. 1/1 |
| 5,873,080 | A | | 2/1999 | Coden et al. |
| 5,913,215 | A | | 6/1999 | Rubinstein et al. |
| 5,987,446 | A | | 11/1999 | Corey et al. |
| 6,012,053 | A | * | 1/2000 | Pant et al. ............................ 1/1 |
| 6,078,914 | A | | 6/2000 | Redfern |
| 6,185,558 | B1 | | 2/2001 | Bowman et al. |
| 6,199,077 | B1 | * | 3/2001 | Inala et al. .................... 715/201 |
| 6,275,820 | B1 | | 8/2001 | Chandra et al. |
| 6,370,527 | B1 | | 4/2002 | Singhal |
| 6,434,556 | B1 | | 8/2002 | Levin et al. |
| 6,601,061 | B1 | | 7/2003 | Holt et al. |

(Continued)

OTHER PUBLICATIONS

File Wrapper for co-pending U.S. Appl. No. 12/341,847, filed Dec. 22, 2008, titled "System, Program Product, and Methods for Online Image Handling".

*Primary Examiner* — Vanel Frenel
(74) *Attorney, Agent, or Firm* — Clayton, Howarth & Cannon, P.C.

(57) ABSTRACT

Systems, program product, and methods of electronic communication network guided navigation which allow users to obtain more relevant product search results much more quickly, are provided. An example of a system can allow a user to enter or start a product search request for a relatively broad term in a search engine and quickly start looking for relevant information by assisting the user in narrowing the product search results in a more efficient guided search. The results can be displayed to a user in a row of boxes, which focus the user on categories of potential intentions or meanings behind the product search request term or terms so that the user's intent can be quickly ascertained and the user directed to results more closely aligned with or coinciding with the user's intent behind the product search request.

29 Claims, 13 Drawing Sheets

U.S. PATENT DOCUMENTS

| | | |
|---|---|---|
| 6,701,310 B1 | 3/2004 | Sugiura et al. |
| 6,728,704 B2 | 4/2004 | Mao et al. |
| 7,076,453 B2 * | 7/2006 | Jammes et al. ............... 705/26 |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,216,115 B1 | 5/2007 | Walters et al. |
| 7,653,573 B2 * | 1/2010 | Hayes et al. ............... 705/26 |
| 2003/0131095 A1 * | 7/2003 | Kumhyr et al. ............. 709/224 |
| 2004/0172379 A1 * | 9/2004 | Mott et al. ................... 707/1 |
| 2005/0131837 A1 | 6/2005 | DeSanctis |
| 2005/0203888 A1 | 9/2005 | Woosley et al. |
| 2005/0273378 A1 | 12/2005 | MacDonald-Korth |
| 2006/0031240 A1 | 2/2006 | Eyal et al. |
| 2006/0069623 A1 | 3/2006 | MacDonald-Korth |
| 2006/0085251 A1 | 4/2006 | Greene |
| 2006/0173817 A1 | 8/2006 | Chowdhury et al. |
| 2007/0073641 A1 | 3/2007 | Perry et al. |
| 2007/0078726 A1 | 4/2007 | MacDonald-Korth |
| 2007/0245013 A1 * | 10/2007 | Saraswathy et al. ......... 709/223 |

\* cited by examiner

| | A | B | C | D | E | F | G | H | I | J | K |
|---|---|---|---|---|---|---|---|---|---|---|---|
| 1 | | Attribute 1 | Attribute 2 | Attribute 3 | Attribute 4 | Attribute 5 | Attribute 6 | Attribute 7 | Attribute 8 | Attribute 9 | Attribute 10 |
| 2 | Product/search term 1 | | | | | | | | | | |
| 3 | Product/search term 2 | | | | | | | | | | |
| 4 | Product/search term 3 | | | | | | | | | | |
| 5 | Product/search term 4 | | | | | | | | | | |
| 6 | Product/search term 5 | | | | | | | | | | |
| 7 | Product/search term 6 | | | | | | | | | | |
| 8 | Product/search term 7 | | | | | | | | | | |
| 9 | Product/search term 8 | | | | | | | | | | |
| 10 | Product/search term 9 | | | | | | | | | | |
| 11 | Product/search term 10 | | | | | | | | | | |

| | A | B | C | D | E | F | G | H | I | J | K |
|---|---|---|---|---|---|---|---|---|---|---|---|
| 1 | | Attribute 9 | Attribute 5 | Attribute 3 | Attribute 4 | Attribute 7 | Attribute 1 | Attribute 2 | Attribute 8 | Attribute 6 | Attribute 10 |
| 2 | Product/search term 4 | | | | | | | | | | |
| 3 | Product/search term 2 | | | | | | | | | | |
| 4 | Product/search term 9 | | | | | | | | | | |
| 5 | Product/search term 6 | | | | | | | | | | |
| 6 | Product/search term 5 | | | | | | | | | | |
| 7 | Product/search term 3 | | | | | | | | | | |
| 8 | Product/search term 7 | | | | | | | | | | |
| 9 | Product/search term 8 | | | | | | | | | | |
| 10 | Product/search term 1 | | | | | | | | | | |
| 11 | Product/search term 10 | | | | | | | | | | |

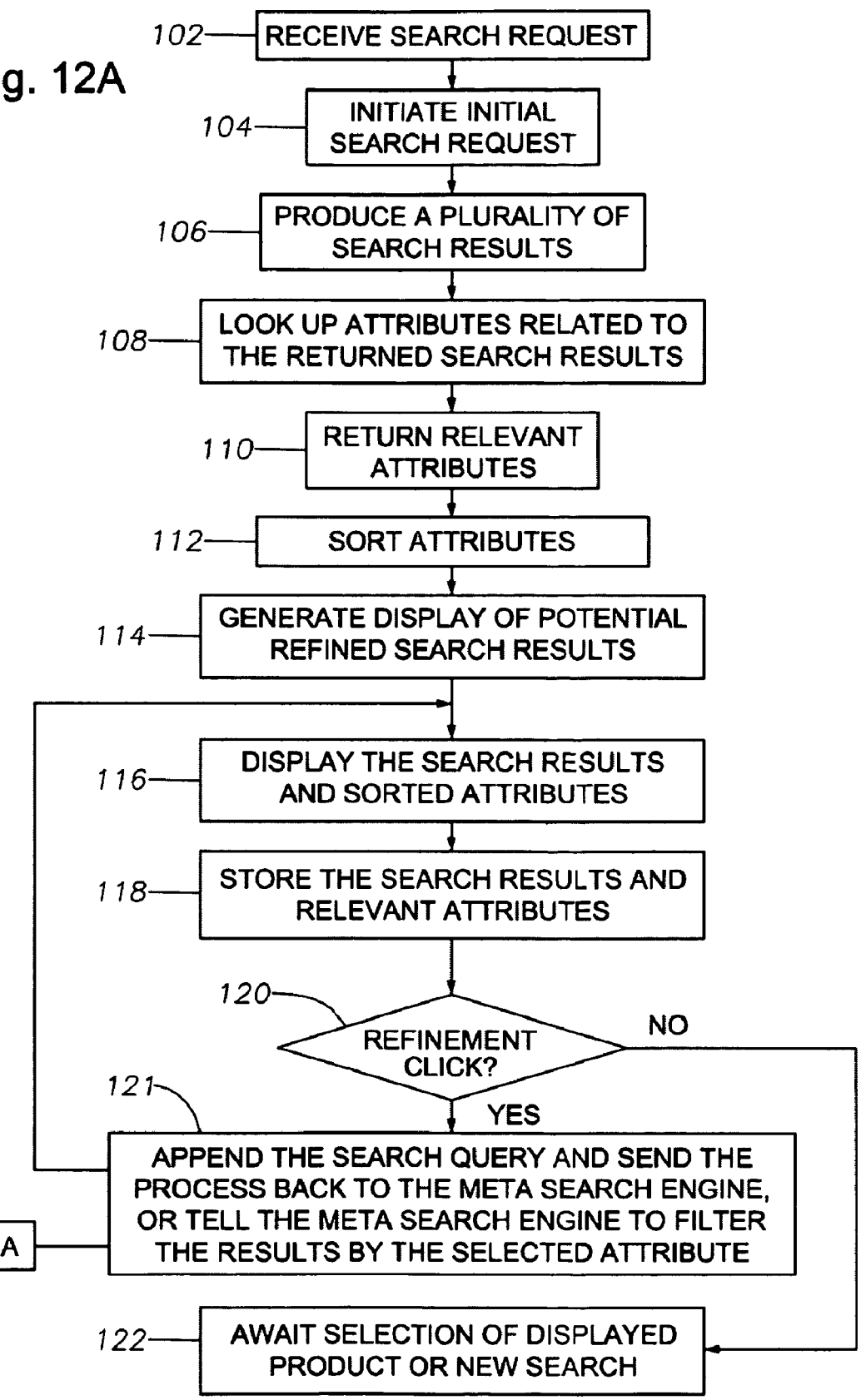

US 7,983,963 B2

SYSTEM, PROGRAM PRODUCT, AND METHOD OF ELECTRONIC COMMUNICATION NETWORK GUIDED NAVIGATION

RELATED APPLICATIONS

This application is a non-provisional patent application of and claims the benefit of and priority to U.S. Patent Application No. 61/048,285 filed on Apr. 28, 2008, titled "System, Program Product and Methods of Electronic Communication Network Guided Navigation," and U.S. Patent Application No. 61/017,500 filed on Dec. 28, 2007, titled "System, Program Product and Methods of Electronic Communication Network Guided Navigation," each incorporated herein by reference in its entirety.

BACKGROUND OF THE INVENTION

1. Field of the Invention

The present invention relates in general to communication network and website searching and navigation and, in particular, to systems, program product, and methods of electronic communication networks guided navigation to provide users with enhanced search presentation tools during online activities.

2. Description of Related Art

As electronic interconnectivity between individuals and entities has been enhanced over the years, hundreds of millions of users each year, for example, search for information and purchase merchandise online through electronic communication networks (e.g., via the World Wide Web (the "Web")). As features of Web exploration and search have been enhanced, more and more specialized Web browsers and user tool bars for searching on the Web have expanded significantly, including the development of fairly sophisticated search engines by numerous search engine providers. By the use of these more specialized Web browsers, user tool bars, and search engines, for example, online or Web based shopping has become a multi-billion dollar industry. Not only are consumers or other users searching for and purchasing new items from online retailers, but consumers are also purchasing items, sometimes previously owned by others, through online marketplaces, e.g., auction sites. Further, even using the Web for finding helpful information to consumers such as online dictionaries, encyclopedias, information on stores, information on products, news, sports and weather information, and numerous other applications have exploded.

By use of the Web, for example, purchasers are not the only ones that have benefited from online marketplaces. Sellers no longer have to resort to retail store floor space, or local newspaper ads, or garage sales to sell their products, all of which takes time, real estate space, and only allow sellers to market their products to local buyers. For a small amount of time and money, on the other hand, sellers on the Web can have worldwide access to potential purchasers for their items. Many people also supplement their income by selling items, such as clothing and toys that their children have outgrown, through online marketplaces. For example, instead of giving the clothing and toys away, sellers can resell the items and recoup at least a portion of the original purchase price.

The online or Web based companies, marketplaces, and information sources, in turn, have become extremely successful propositions for large to small companies of various types of goods and services, and even for individuals. Nevertheless, the result has been more and more data, such as product information, being accessible and searchable by Web search engines, such as Google, Yahoo, and others. In turn, speed has slowed user friendliness and search results have become more complex, and the quantity of data search results can be overwhelming, all discouraging use of the Web, including online shopping. For example, when too many choices return to a user from a Web search using a conventional search engine, e.g., when a user makes a relatively broad search request and a relatively large number of broad match search terms are returned to the user, a user often understands that much of these results are not relevant to the user's needs. The only way that a user can reduce the number of results is by retyping the query, adding additional terms to the query, or by selecting an advanced search, which also can be viewed as appending an earlier query. Further, once a user selects a specific product to view the product in more detail, the conventional proprietary web sites can present users a list of other products and other proprietary sites users that have bought the specific selected product have also purchased.

Although most current search engines associated with marketplace websites have some usefulness, their shortcomings collectively represent impediments to the user readily accessing data relevant to a search request, quickly locating product or other information, effectively using information to be located, and the conduct of e-commerce, for example, which are addressed and overcome by various embodiments of the present invention.

Recognized by inventors, therefore, is the need for a system, program product, and methods which assist the user in narrowing of the search results in a more efficient guided search.

SUMMARY OF THE INVENTION

In view of the foregoing, various embodiments of the present invention, for example, advantageously provide systems, program products, and methods for performing electronic communication network guided navigation, which allow users to obtain more relevant search results much more quickly. For example, various embodiments of systems, program products, and methods of the present invention allow a user to enter or start a search request for a relatively broad term in a search engine and quickly start looking for relevant information by assisting the user in narrowing the search results in a more efficient guided search. In such embodiments of the present invention, the results can be displayed to a user in a row of boxes, for example, which focus the user on categories of potential intentions or meanings behind the search request term so that the user's intent can be quickly ascertained and the user directed to results more closely aligned with or coinciding with the user's intent behind the search request.

By providing a user revised search result selections (also called search refinements or characteristics of the returned search results) in an organized and efficient format to thereby funnel or guide the search based on the user's perceived or potential intent, various embodiments of a system, program product, and methods of the present invention can treat the refined result options just as important as the search results, themselves. For example, the most relevant characteristics can be grouped and displayed to a user as links, as understood by those skilled in the art, and can be called refinement links. Groups of refinement links can be referred to as refinement categories. In turn, by focusing on improving the quality and format of the search refinement, such systems, program product, and methods create less of an impediment for using an electronic communications network search enhances user friendliness on a display, and significantly enhances the speed of retrieving a desired search result. Such systems, program product, and methods also, for example, can focus on significantly improving the quality of the relevant refinements to thereby significantly improve a user's search or website search experience. In contrast, conventional Web search engines and conventional website search engines tend to focus only on the natural and paid listings relevancy. These conventional techniques merely take broad metadata results, attempt to display them to a user, clutter the web page displayed, and do little to focus on user potential intention.

A metadata search engine or a meta-search engine for a website, for example, can access one or more contented databases associated with the website, e.g., through an icon, link, series of links, or a text box, etc. The search engine can then provide results to a pre-selected repository such as in a portion of a computer or software, e.g., a cache or a cache layer in a program product or for other storage facility, as understood by those skilled in the art. The meta-search engine can assist in organizing the search responsive to one or more attribute databases. Such attribute databases can also be used to periodically refresh the pre-selected repository with up to date search results over selectable periods of time. By providing a combination of the refinement categories and refinement links, and a pre-selected repository arrangement, for example, the speed of the search results can be significantly increased and the volume of data, e.g., databases where relevant content may reside, is significantly reduced.

Various embodiments of the present invention also provide systems, program product, and methods which identify a customer's position in the customer lifecycle based, for example, on the customer's stored purchasing history. Using such data, various embodiments of the present invention can provide sort options with a focus on products having a high order conversion rate to non-customers and relatively new customers, and can provide sort options with a focus on products providing higher profits to those who are already loyal customers. As such, various embodiments of the present invention can provide targeted product sorting to help build customer equity by establishing consistent purchasing loyalty before attempting to maximize short-term profits.

More specifically, various embodiments of the present invention can include a system for performing electronic communication network guided navigation thereon, which can facilitate a guided navigational search by one or more users of one or more remote user computers in communication with an online retail or wholesale store computer/server ("e-commerce computer") through an electronic communication network, is provided. Such a system, according to an example of an embodiment of the present invention, can include a first computer associated with an online retail or wholesale store website, one or more second computers positioned remote from the first computer and in communication with the first computer through an electronic communication network defining an internet, and guided navigational search program product stored on a tangible computer medium that is readable by the first computer to facilitate a guided navigational search by one or more users of the one or more remote second computers.

The guided navigational search program product, for example, can include a set of instructions that when executed by the first computer, causes the first computer to perform the operations of initiating an initial search request as received from one or more remote second computers for one or more search terms by use of a search engine whereby the search engine addresses one or more searchable databases also associated with the online retail or wholesale store website. In this example of an embodiment of a system, the operations can also include producing a plurality of search results responsive to the initial search request, and generating a search results content page including a plurality of potential refined search results responsive to either the plurality of search results produced in response to the initial search request and at least one website user interaction refinement or responsive to a plurality of predetermined search results stored in a pre-selected repository, for display on a display of the one or more remote second computers in communication with the internet and being accessible by a user thereof.

Having the most popular search queries or requests in a pre-selected repository beneficially can improve the performance on load time of a system. Also, a pre-selected repository, as understood by those skilled in the art, can store data from various sources all in the same place for fast performance. The search results content page can also include a plurality of user selectable refinement categories arranged in a pre-selected pattern defining a guided navigational tool so that when a user selects a portion of the guided navigational tool, a user search is substantially more focused and thereby assists the user in more quickly narrowing the search results to more specific user desired search results. Accordingly, the operations can also include updating the search results content page to include a plurality of user refined search results responsive to user selection of a portion of the guided navigational tool.

Various embodiment of the present invention can also include methods of facilitating a guided navigational search by one or more users of one or more remote user computers in communication with an online retail or wholesale store computer through an electronic communication network, which can include, for example, application of a generated or otherwise provided guided navigational search tool configured to facilitate the guided navigational search.

According to an example of an embodiment of the present invention, such a method can include, for example, the step of providing through the communication network a search request content page having a pre-selected format, viewable on a display of one or more user computers, and including fields for entering into the search request content page search request criteria comprising one or more search terms. The method can also include the steps of initiating an initial search request responsive to receipt of the one or more search terms from the one or more remote second computers, returning a plurality of search results responsive to the initial search request, and accessing a plurality of general product attributes associated with the plurality of returned search results. The method can also include determining at least one website user interaction refinement associated with a specific customer user, which can be based upon a customer user lifecycle stage with the e-commerce product provider for the specific customer user and a traffic segment purchasing expectation associated with a traffic segment classification associated with the specific customer user, and sorting the returned search results responsive to at least one website user interaction refinement and alternatively the plurality of general product attributes to thereby form a plurality of potential refined search results.

The step of determining at least one web site interaction refinement can include identifying: the traffic segment classification associated with the specific customer user, the traffic segment purchasing expectation associated with the traffic segment classification further associated with the specific customer user, and the customer user lifecycle stage with the e-commerce product provider for the specific customer user. Additionally, the step of sorting the returned product search results can include sorting the returned product search results by at least one of the following: units sold per day, revenue per day, or profit per day, or other relevant measurements as known to those skilled in the art defining a plurality of presentation metrics, for each respective returned product, according to the traffic segment classification associated with the specific customer user; and returning the plurality of potential refined product search results sorted according to one of the plurality of presentation metrics, with the one of the plurality of presentation metrics selected responsive to the customer user lifecycle stage with the e-commerce product provider for the specific customer.

The method can further include generating a search results content page including at least a subset of the plurality of potential refined search results (including the most expected-to-be relevant products) and at least a subset of the sorted plurality of general product attributes for display on a display of the one or more remote second computers responsive to the plurality of search results and the associated general product attributes. The search results content page can also include a plurality of refinement categories containing various categorized product attributes to define the guided navigational tool.

According to another embodiment of the present invention, the website user interaction attributes are derived from or otherwise includes information representing at least portions of a traffic segment purchasing expectation matrix comprising a plurality of traffic segments referenced to a plurality of products, with the information refined by a traffic segment purchasing expectation associated with a traffic segment classification for a specific user, and further refined by a user lifecycle stage with the e-commerce product provider for the specific user.

According to this embodiment, the attributes defining the customer user lifecycle stage can include, for example, at least one or a combination of two or more of the following: general purchasing history with the e-commerce product provider, categorical purchasing history with the e-commerce product provider, recency of purchases, temporal timeline between purchases, length of affiliation with the e-commerce product provider, for the specific customer user, the number of positive reviews given for products (customers who give positive reviews are more likely to be loyal customers), number of negative given reviews for products (customers who give negative reviews have a higher chance of not making additional purchases), and/or involvement in a community page for the online website.

The attributes defining the traffic segment purchasing expectation can include at least one or a combination of two or more of the following: one or more demographic attributes of the traffic segment, a frequency of selection of previous search results by one or more customer users or categories of customer users defining clicks, a frequency of sales of specific items from an online website, price points purchased, an amount of sales of the specific items from an online website, an amount of profit from sales of the specific items from an online website, a number of previous clicks of a customer user visiting an online website, a customer user's email address, a customer user's IP address, a customer user's web browser identification (identification via web browser cookies), a user's website membership account number, a customer user's geographic location, one or more customer user's preferences, a customer user's previous purchasing patterns of visiting an online website, a customer user's previous visits to a content page, number of visits between purchases, number of visits before first purchase, time since last visit, average time spent on site, number of products detail views, additions to online shopping cart, and number of visits with repeat view of same product, a customer user's other online browsing history, a customer user's number of contacts with customer service, a customer user's time zone, a customer user's language settings, a customer user's purchasing method preference, a customer user's prior user selectable refinements, and/or other relevant measurements.

According to an example of an embodiment of the method, a guided navigational tool including the plurality of user selectable refinement categories arranged in a pre-selected pattern, is configured so that when a user selects a portion of the guided navigational tool, a user search is substantially more focused and thereby provided with significantly fewer search results than the results generated without use of the guided navigational tool. Additionally, the pre-selected pattern of the guided navigational search tool can include one or more rows, and each of the plurality of user refinement categories can define a column having a plurality of user-selectable subcategory rows which include a user selectable refinement or refinement attribute. As understood by those skilled in the art, the portion of the guided navigational search tool that a user selects, can include either or both of a column and a subcategory row within the guided navigational tool so that a user search is substantially more focused and thereby able to provide the user with significantly fewer search results than the results generated without use of the guided navigational tool.

The method can also include the steps of appending the search request responsive to user selection of a portion of the guided navigational tool defining a user selectable refinement or refinement attribute, and generating a second search results content page defining an updated search results content page including a plurality of user refined search results for display on the display of the one or more remote second computers. The user selectable refinements or refinement attributes are sorted and ordered for display on the search results content page responsive to one or more user interaction refinements. Such user interaction refinements can include, for example, a user selection, e.g., "mouse click" of a refinement in the form of a product attribute.

A method, according to another example of an embodiment of the present invention, can include the steps of receiving a search request including a plurality of potential refined search results comprising one or more search terms and at least one user interaction refinement, and generating a search results content page responsive to the search request and at least one user interaction refinement. The search results content page is characterized by being accessible and readily viewable by the user and also includes a plurality of user selectable refinement categories arranged in one or more rows and each of the plurality of user refinement categories defining a column having a plurality of user-selectable subcategory rows so that when a user selects a column and a subcategory row defining a user selectable refinement, a user search is substantially more focused and thereby assists the user in more quickly narrowing the search results to more specific user desired search results. The method also includes the steps of updating the search results content page to include a plurality of user refined search results responsive to user selection of the user selectable refinement, assigning a higher relevancy value to one or more of the following: a user selected refinement category row element or a user selected refinement category column associated with the user selectable refinement responsive to user selection thereof, and assigning an enhanced visual position within the search results content page to the one or more of the following: a user selected refinement category row element or a user selected refinement category column associated with the user selectable refinement, responsive to the higher relevancy value.

Various embodiments of the present invention include program product stored in a tangible computer medium. The program product, according to an example of an embodiment of the present invention, can include guided navigation program product stored on a tangible computer medium such as, for example, memory of an online retail or wholesale store computer defining an online e-commerce computer. The guided navigation program product can include instructions that when executed by a computer (e.g., online e-commerce computer associated with an online retail or wholesale website featuring a plurality of goods, services, or goods and services, collectively referred to as products), cause the computer to perform operations to facilitate a guided navigational search by one or more users of one or more remote user computers in communication with the computer through an electronic communication network. The operations can include receiving a search request comprising one or more search terms, initiating an initial search request responsive to receipt of the one or more search terms, returning a plurality of initial search results responsive to the initial search request, and accessing a plurality of general product attributes associated with the plurality of returned search results and at least one pre-determined website user interaction refinement, which can include information representing a matrix comprising a user lifecycle stage with the e-commerce product provider for a specific user and/or traffic segment purchasing expectations associated with a traffic segment classification for the specific user.

The operations can also include sorting the returned search results responsive to the at least one website user interaction refinement and sorting to the general product attributes to thereby generate a displayed plurality of refinement categories and a plurality of potential refined search results, and providing data over the communication network to display a search results content page plurality of potential refined search results on a remote user computer responsive to the one or more search terms and one or more website user interaction refinements associated therewith. The search results content page includes the plurality of potential refined search results generated, and the plurality of refinement categories each including at least one, but preferably a plurality of user selectable refinement links each indicating an associated one of a plurality of user selected refinements and positioned so that when a user selects one of the plurality of refinement links, a user search is substantially more focused and thereby assists the user in more quickly narrowing the search results to more specific user desired search results.

The operation also include providing data over the communication network to update the search results content page to include a plurality of user refined search results responsive to user selection of one of the plurality of user selectable refinement links, assigning a higher relevancy value to the user selected refinement associated with the user selected refinement link responsive to user selection thereof, and assigning an enhanced visual position within the search results content page to the user selectable refinement represented by the user selected refinement link responsive to the higher relevancy value.

Program product, according to another example of an embodiment of the present invention, includes guided navigation program product which can include instructions that when executed by a computer, cause the computer to perform the operations of initiating a search request for one or more search terms in one or more databases in communication with the search request, and aggregating predetermined search results, which can be determined by one or more previous search requests. The operations can also include accessing the aggregated predetermined search results, and generating a user display of a plurality of potential refined search results. According to an embodiment of the program product, the user display is accessible and readily viewable by the user and can provide a plurality of user selectable refinement categories arranged in a row with each of the plurality of user refinement categories, for example, defining a column having a plurality of user-selectable subcategory rows so that when a user selects a column and a row, a user search is substantially more focused and thereby able to assist the user in more quickly narrowing the search results to more specific user desired search results.

Program product, according to yet another example of an embodiment of the present invention, includes guided navigation program product stored on a tangible computer medium, such as, for example, one or more various types of memory that is readable by the first computer to facilitate a guided navigational search by one or more users of one or more remote second user computers including a browser tool and in communication with the first computer through an electronic communication network defining an internet. The guided navigational search program product can include instructions that when executed by the first computer, cause the first computer to perform the operations of initiating an initial search request as received from the one or more remote second computers for one or more search terms, producing a plurality of search results responsive to the initial search request, sorting a plurality of attributes of the plurality of search results responsive to a plurality of user refinements, and generating a user display of a plurality of potential refined search results. The user display can include the plurality of user selectable refinement categories arranged in one or more rows with each of the plurality of user refinement categories defining a column having a plurality of user-selectable subcategory rows defining a guided navigational tool, so that when a user selects a column and a subcategory row within the guided navigational tool, a user search is substantially more focused and thereby able to assist the user in more quickly narrowing the search results to more specific user desired search results.

The operations can further include positioning the plurality of search results in a pre-selected repository (e.g., including the plurality of search results and the plurality of search request refinements) so that subsequent search requests can access the pre-selected repository of the plurality of search results prior to accessing the plurality of databases and so that more popular search requests can take less time to receive the plurality of search results.

Program product, according to another example of an embodiment of the present invention, includes instructions that when executed by a computer, cause the computer to perform the operations of returning a plurality of product search results, identifying a customer user lifecycle stage with the e-commerce product provider for a specific customer user, selecting one of a plurality of presentation metrics responsive to the customer user lifecycle stage with the e-commerce product provider for the specific customer, returning a plurality of potential refined product search results according to the selected one of the plurality of presentation metrics, and generating a product search results content page including at least a subset of the plurality of potential refined product search results for display on a display of the one or more remote second computers.

The operations can further include identifying a traffic segment classification associated with the specific customer user, and identifying a traffic segment purchasing expectation associated with the traffic segment classification associated with the specific customer user to thereby determine at least one website interaction refinement, and sorting the returned product search results responsive to the at least one website user interaction refinement to thereby form a plurality of potential refined product search results. The operation of sorting can include sorting the returned product search results by the at least one of the plurality of presentation metrics for each respective returned product according to the traffic segment classification associated with the specific customer user, and responsive to the traffic segment purchasing expectation associated with the specific customer user.

Program product, according to yet another example of an embodiment of the present invention, includes instructions that when executed by a computer, cause the computer to perform the operations of returning a plurality of product search results, identifying a traffic segment classification associated with a specific customer user, and a traffic segment purchasing expectation associated with the traffic segment classification associated with the specific customer user, for example, to thereby determine at least one website interaction refinement, and sorting the returned product search results responsive to at least one website user interaction refinement to thereby form a plurality of potential refined product search results, whereby the operation of sorting can include sorting the returned product search results according to the traffic segment classification associated with the specific customer user responsive to the traffic segment purchasing expectation associated with the specific customer user. The operations can also include generating a product search results content page including at least a subset of the plurality of potential refined product search results for display on a display of the one or more remote second computers.

The operations can further include identifying a customer user lifecycle stage with the e-commerce product provider for a specific customer user, and selecting one of a plurality of presentation metrics responsive to the customer user lifecycle stage with the e-commerce product provider for the specific customer, and can include returning a plurality of potential refined product search results sorted according to the selected one of the plurality of presentation metrics.

Various embodiments of the present invention also include a computer readable medium that is readable by a computer to facilitate electronic searching of a plurality of databases in communication through an electronic communication network. According to an example of an embodiment of the computer readable medium, the computer readable medium can include a set of instructions that, when executed by the computer, cause the computer to perform the operations of initiating a search request responsive to receipt of one or more search terms, producing a plurality of search results responsive to the search request, generating a search results content page for a page of a website, and updating the content page for a user display with a plurality of potential refined search results responsive to the plurality of search results. The updated content page for the user display can include a plurality of user selectable refinement categories arranged in one or more rows with each of the plurality of user refinement categories defining a column having a plurality of user-selectable subcategory rows. Further, the updated content page can be configured so that when a user selects a column and a subcategory row, a user search is substantially more focused and thereby able to assist the user in more quickly narrowing the search results to more specific user desired search results.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 7A-7B are tables of a plurality of attributes according to an embodiment of the present invention;

FIGS. 12A-B is a schematic flow chart of a method of performing a guided navigational search according to an embodiment of the present invention.

DETAILED DESCRIPTION

Figure 1:
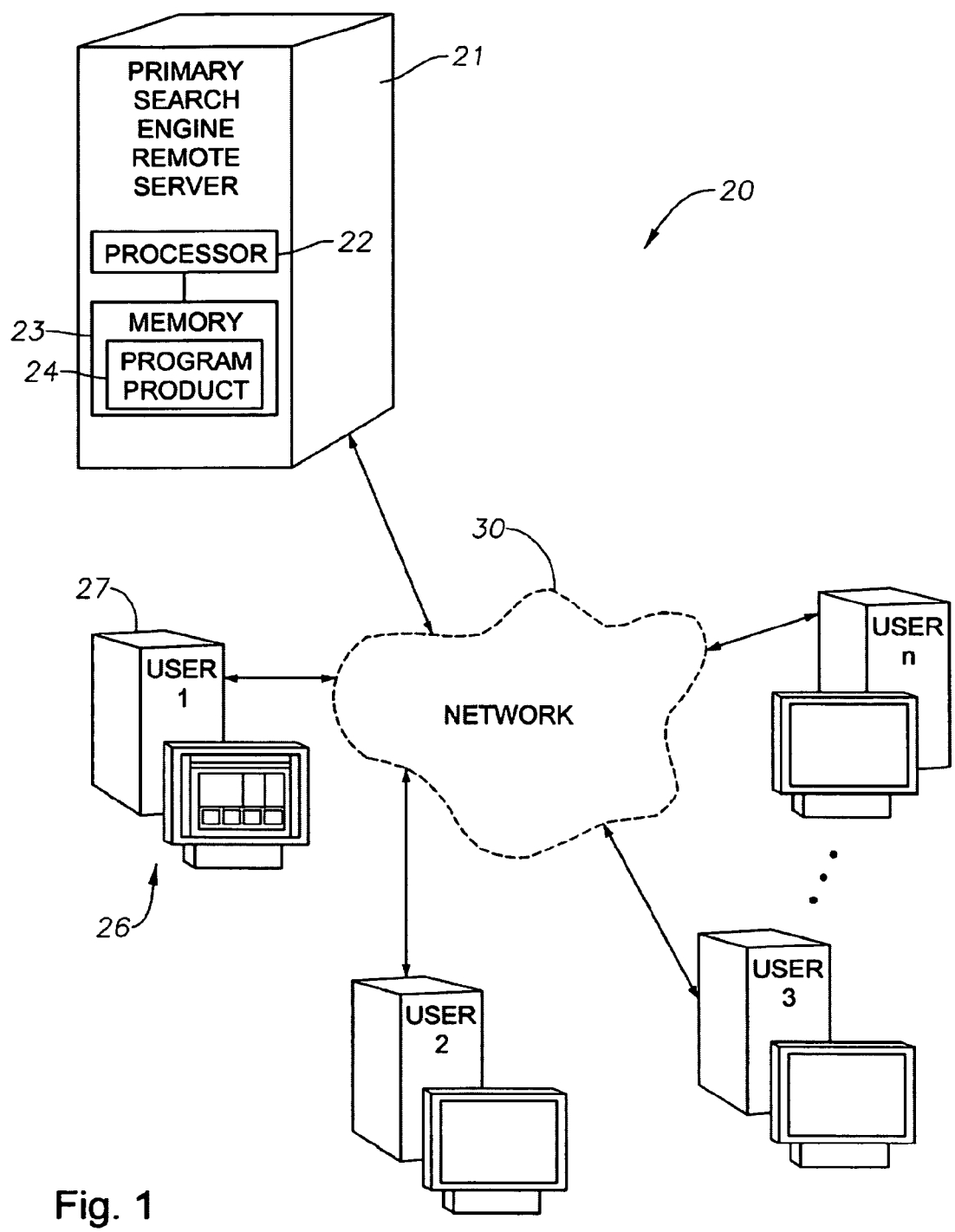
FIG. 1 is a schematic diagram of a system of an electronic communications network guided navigation according to an embodiment of the present invention.

The present invention now will be described more fully hereinafter with reference to the accompanying drawings in which various embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Note, it should be understood that "customer" when referred to, herein, may include retail, wholesale, or retail and wholesale customers, and potential customers which have not yet purchased a product from a certain online retailer or wholesaler.

As illustrated in FIGS. 1-12B, for example, when conducting a search on an electronics communication network such as the Internet or World Wide Web and using a conventional online retailer or wholesaler search engine, a user search request for the term "golf" by itself can, for example, provide hundreds of thousands of results. By using various embodiments of systems, program products, or methods of the present invention, a user can search product databases associated with an online retailer or wholesaler over any electronics communication network and filter through the hundreds of thousands of search results for "golf" significantly faster than by otherwise appending to the original search query for the "golf" term to eventually drill down to the desired item.

Various embodiments of the present invention provide systems, program products, and methods for facilitating electronic communication network guided navigation, which allow users to obtain more relevant search results much more quickly than conventionally possible. For example, various embodiments of systems, program products, and methods of the present invention allow a user to enter or start a search request for a relatively broad term in a proprietary search engine or engines of an online retailer, for example, and quickly start looking for relevant information by assisting the user in a more efficient guided search. In such embodiments of the present invention, the results can be displayed to a user in a row of boxes, for example, which focus the user on categories of potential intentions or meanings behind the search request term, so that the user's intent can be quickly ascertained and so that the user can be directed to results more closely aligned with or coinciding with the user's intent behind the search request.

Although one set of solutions provides a list of products eventually purchased based upon a product currently displayed, and another set of solutions provides product sort options that include sorting to emphasize "top sellers" defined in terms of gross margin dollars, units sold, and revenue to yield the best immediate profits, such solutions assume the need for one static sort options to fit all customers and do not account for long-term customer equity. Beneficially, various embodiments of the present invention can provide product search results that account for such long-term customer equity and that are more effective in producing loyal customers. That is, various embodiments of the present invention provide systems, program product, and methods that can identify a customer's position in the customer lifecycle, for example, based on the customer's stored purchasing history. Using such data, various embodiments of the present invention can provide one or more sort options with a high order conversion rate to non-customers and relatively new customers, and can provide one or more sort options having higher profits to those who are already loyal customers. As such, various embodiments of the present invention can provide targeted product sorting to help build long-term customer equity by establishing consistent purchasing loyalty before attempting to maximize short-term profits.

Figure 2:
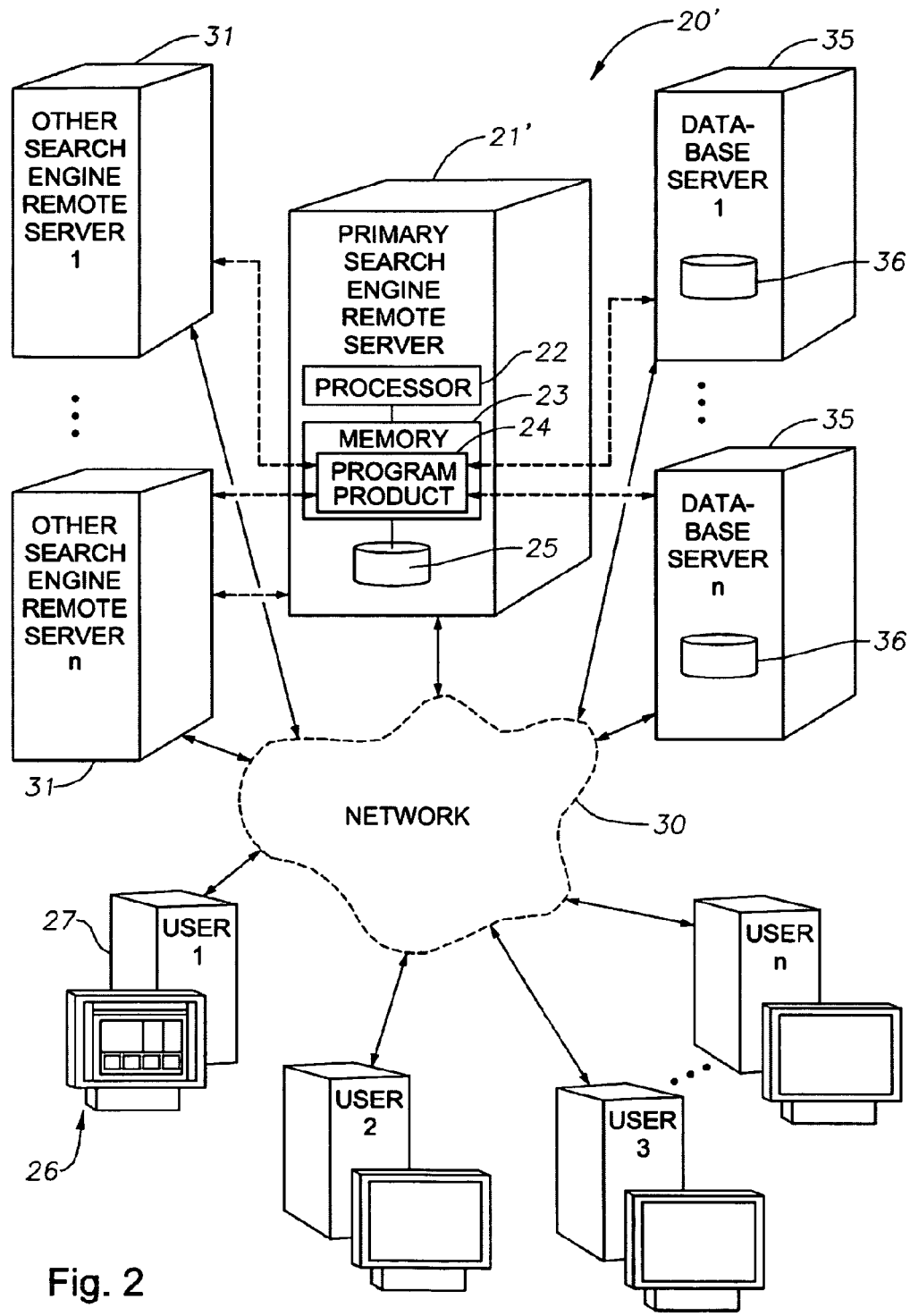
FIG. 2 is a schematic diagram of a system of an electronic communications network guided navigation according to an embodiment of the present invention.
Figure 3:
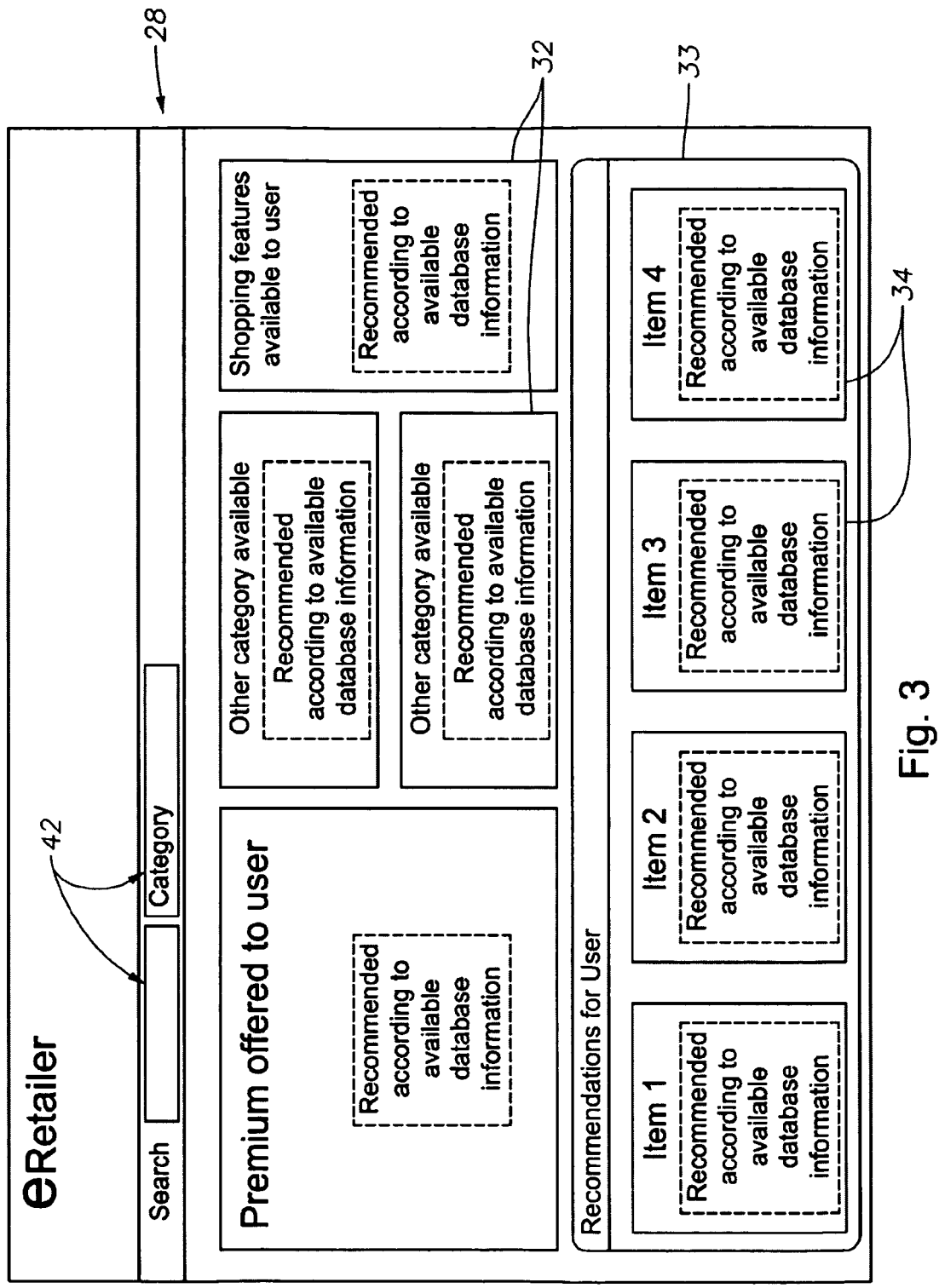
FIG. 3 is a schematic diagram of a user display generated on an electronic retailer website of a system of an electronic communication network guided navigation prior to initiating a user search request according to an embodiment of the present invention.

As perhaps best shown in FIGS. 1-2, according to examples of embodiments of the present invention, a system 20, 20' can be positioned to conduct a guided navigational search on an online retailer/wholesaler website. For example, such a system 20, 20', can include a first online retailer or wholesale services e-commerce computer, e.g., search engine remote server 21, 21' shown in FIGS. 1 and 2, including a processor 22 and memory 23, and one or more second computers, e.g., user computers 27, positioned remote from and in communication with the search engine remote server 21, 21', through an electronic communication network 30 such as the Internet or other internetwork. The system 20, 20', can also include guided navigational search program product 24 stored on a tangible computer medium, such as, for example, one or more various types of memory, such as, for example, memory 23 of the search engine remote server 21, 21', that is readable by the search engine remote server 21, 21', to facilitate a guided navigational search by one or more users of the one or more remote user computers 27. The system 20, 20' can also include a plurality of database servers, such as, for example, database server 35 (FIG. 2) associated with the online retail/wholesaler website having data stored thereon searchable either directly or through search engine remote server 21, 21'. The system 20' can further include a plurality of other search engine remote servers 31 positioned remotely from the "primary" search engine remote server 21, 21', each of which can be similarly associated with one or more database servers 35 located remotely or located local to each of the other search engine remote servers 31. The other search engine remote servers 31 can beneficially provide service to geographically remote users, and enhance geographically distributed operations.

As understood by those skilled in the art, the memory 23 of the server 21, 21', can include volatile and nonvolatile memory known to those skilled in the art including, for example, RAM, ROM, and magnetic or optical disks, just to name a few. It should also be understood by those skilled in the art that although illustrated as a single server, the illustrated configuration of the search engine remote server 21, 21', is given by way of example and that other types of servers or computers configured according to various other methodologies known to those skilled in the art can be used. The server 21, 21', shown schematically in, for example, FIGS. 1 and 2 represent a server or server cluster or server farm and is not limited to any individual physical server. The server site may be deployed as a server farm or server cluster managed by a server hosting provider. The number of servers and their architecture and configuration may be increased based on usage, demand and capacity requirements for the system 20, 20'. Similarly, the other search engine remote server for servers 31 and the database server for servers 35 shown schematically in, for example, FIG. 2 each represent a server or server cluster or server farm and is not limited to any individual physical server or configuration. As also understood by those skilled in the art, user computers 27 in these embodiments can be a laptop, desktop, personal digital assistants or PDAs, cell phones, servers, computers, or other types of computers. As known and understood by those skilled in the art, the network 30 can include an internet or world wide web of a plurality of computers/servers in communication with one or more other computers through a communication network, and/or portions of a local or other area network.

As further understood by those skilled in the art, the program product 24 can be in the form of microcode, programs, routines, and symbolic languages that provide a specific set for sets of ordered operations that control the functioning of the hardware and direct its operation, as known and understood by those skilled in the art. The program product 24, according to an embodiment of the present invention, also need not reside in its entirety in volatile memory, but can be selectively loaded, as necessary, according to various methodologies as known and understood by those skilled in the art. As further understood by those skilled in the art, the term "computer-readable medium" encompasses distribution media, intermediate storage media, execution memory of a computer, and any other medium or device capable of storing the program product 24 implementing the functionality or processes of various embodiments of the present invention for later reading by a computer. The program product 24 can be copied from the computer-readable medium to a hard disk or a similar intermediate storage medium. When the program product 24, or portions thereof, are to be run, it can be loaded either from their distribution medium or their intermediate storage medium into the execution memory of the computer, configuring the computer to act in accordance with the functionality or method of various embodiments this invention. All such operations are well known to those skilled in the art of computer systems.

According to an exemplary embodiment of the present invention, the guided navigational search program product 24 can include a set of instructions that when executed by the search engine remote server 21, 21', for example, causes the search engine remote server 21, 21', to perform the operations of: providing a user a search request content page 28, e.g., E-retailer content page, etc. (see, e.g., FIG. 3), as viewed, for example, on a display 26 of one or more remote user computers 27, through the communication network 30, e.g., internet; receiving an initial search request in response to the user clicking on a "Web" search link or list/drop-down menu 42 or entering one or more search terms in one or more search term entry fields, for example; and making or performing a search using the one or more search terms. According to the exemplary embodiment of the present invention, the initial search request for one or more search terms can be performed through or on one or more computers (e.g., computers 21, 21', 31, 35) and/or databases (e.g., databases 25, 36) associated with the online retail/wholesaler website, as received, for example, from the one or more remote user computers 27 and entered into or selected via the one or more search term entry fields or lists/drop-down menus 42 (see, e.g., FIG. 3) of for example, a graphical user interface of a Web browser presented on a user display 26, for example, in the form of a search request content page 28. Note, in addition to search term entry fields or lists/menus 42, the graphical user interface can include various related categories/advertising fields 32, and/or item recommendations-type fields 33 including recommended items fields 34, along with others known to those skilled in the art.

The search can include use of a meta search engine 82 (see, e.g., FIGS. 8-10) accessible to the user computer 26 that can directly or indirectly address the search engine remote server 21, 21', and database servers 35, having searchable data thereon associated with the online retail/wholesale website and having one or more searchable databases 25, 36. The searchable databases can include a website user interaction attribute database 25 having attributes associated with user interaction with the website, and a product attribute database 36 having a plurality of attributes associated with various goods and services as described by the one or more search terms, which can be used to formulate refinement categories and refinements. According to the exemplary embodiment of the present invention, database 25 is stored in memory 23 of the search engine remote server 21, 21'. Alternatively, database 25 can be stored in the memory of one or more of the database servers 35 associated with the online retail/wholesale website. Note, such attributes can overlap between the respective databases 25, 36, or can be contained together in a single database or cluster of related or relational databases.

According to an embodiment of the present invention, examples of website user interaction attributes (refinements) stored, for example, in the website user interaction attributes database 25 can include various combinations of one or more of the following: data such as frequency of selection of previous search results by one or more users or categories of users defining clicks, frequency of sales of items from a website, amount of sales of items from a website, amount of profit or revenue from sales of items from a website, previous clicks of a user visiting a website, user's email address, user's geographic location, user's preferences, user's previous visits to a content page, previous purchasing patterns of a user visiting a website, "juice," conversion, and reviews/visits, etc., for each search result link to be displayed as part of the guided navigation and search, purchase history of a specific user for a specific product/service or category of product/service, purchase history of a traffic segment for a specific product/service or category of product/service, etc., just to name a few. Such attributes can be gathered using methodologies known to those skilled in the art of computer systems.

According to another embodiment of the present invention, the website user interaction attributes are derived from or otherwise defined in the form of a multidimensional matrix including a customer user lifecycle stage with the e-commerce product provider for the specific customer user, in view of a traffic segment purchasing expectation associated with a traffic segment classification for the specific customer user, which can be assessed in further view of attributes of identified products returned in response to either the initial or follow-on user refined search. The attributes defining the customer user lifecycle stage of the at least one website user interaction refinement can include, for example, one or more of the following: general purchasing history with the e-commerce product provider, categorical purchasing history with the e-commerce product provider, length of affiliation with the e-commerce product provider, number of positive reviews given for products, number of negative given reviews for products, and involvement in a community page for the online e-commerce website, for the specific customer user. The attributes defining the traffic segment purchasing expectation of the at least one website user interaction refinement can include one or more of the following: one or more demographic attributes of the traffic segment, a frequency of selection of previous search results by one or more customer users or categories of customer users defining clicks, a frequency of sales of specific items from an online website, an amount of sales of the specific items from an online website, an amount of profit from sales of the specific items from an online website, a number of previous clicks of a customer user visiting an online website, a customer user's email address, a customer user's IP address, a customer user's web browser identification, a user's website membership account number, a customer user's geographic location, one or more customer user's preferences, a customer user's purchasing method preference, a customer user's previous visits to a content page, a customer user's previous visits to a content page, number of visits between purchases, number of visits before first purchase, time since last visit, average time spent on site, number of products detail views, additions to online shopping cart, number of visits with repeat view of same product, and number of contacts with customer service, a customer user's time zone, a customer user's language settings, a customer user's purchasing method preference, a customer user's previous purchasing patterns of visiting an online website, and/or other online browsing history.

According to an embodiment of the present invention, examples of product attributes (refinements) stored in product attribute database 36 can include, for example, data describing the details of the various features of the product such as category of goods or services, brand, handiness, associated demographics, price, quantity, marketing category, etc., just to name a few. Note, the term "product" is meant to generally refer to goods, services, and both goods and services.

Figure 8:
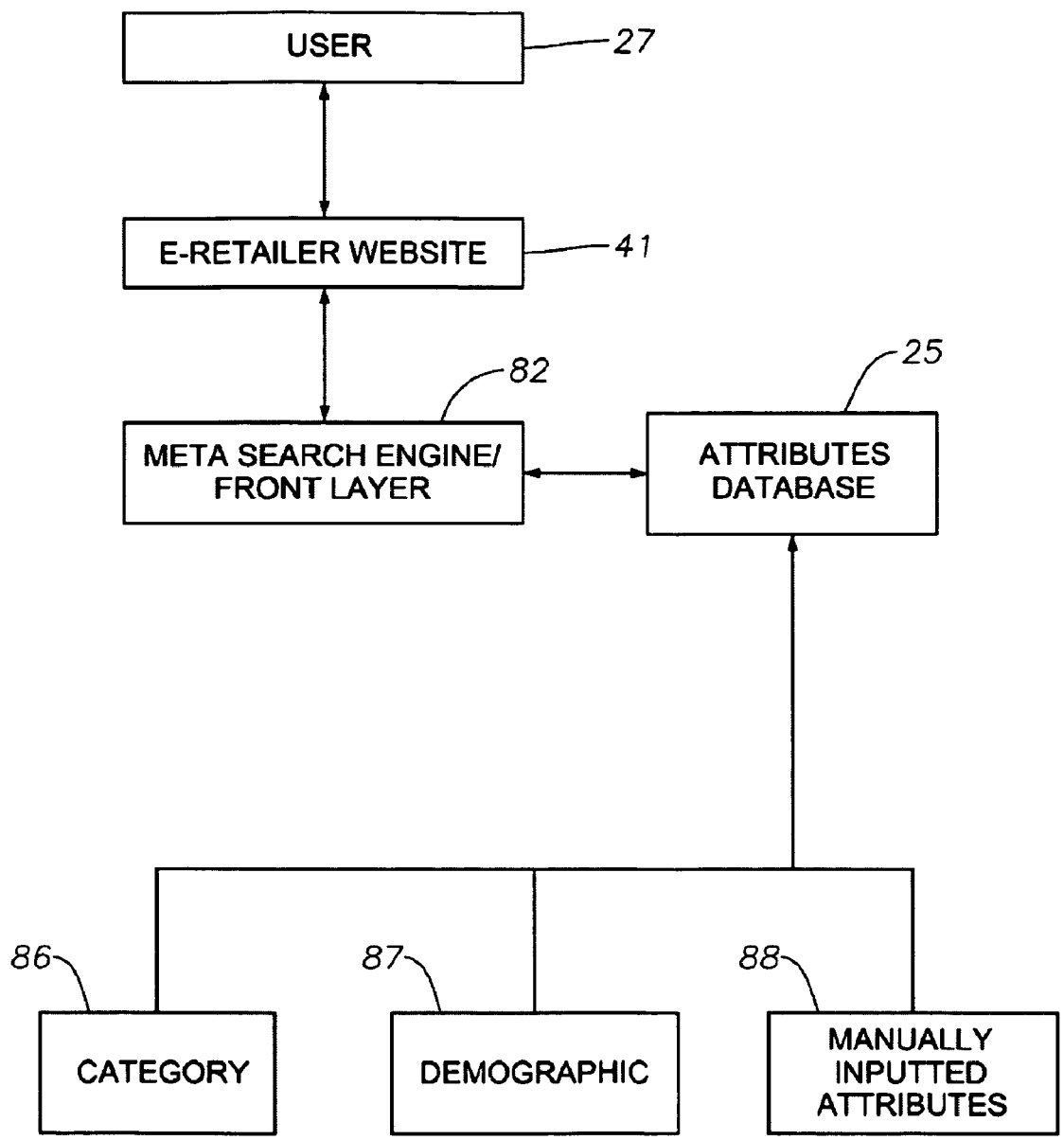
FIG. 8 is a schematic block diagram of a portion of a system for performing a guided navigational search over an electronic communication network according to an embodiment of the present invention.
Figure 9:
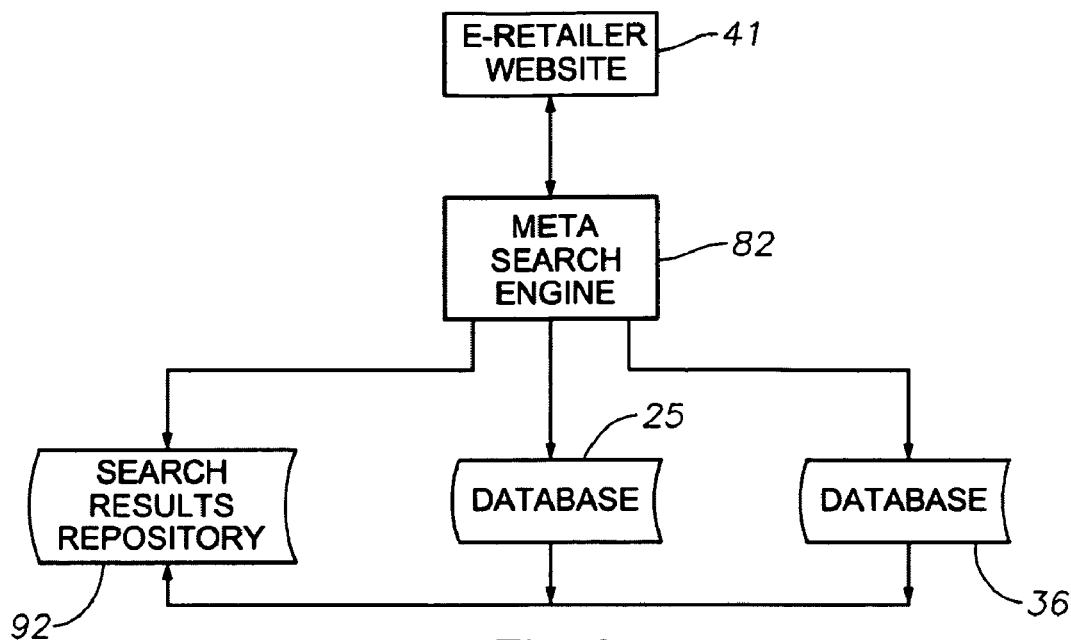
FIG. 9 is a schematic block diagram of a portion of a system for performing a guided navigational search over an electronic communication network according to an embodiment of the present invention.
Figure 10:
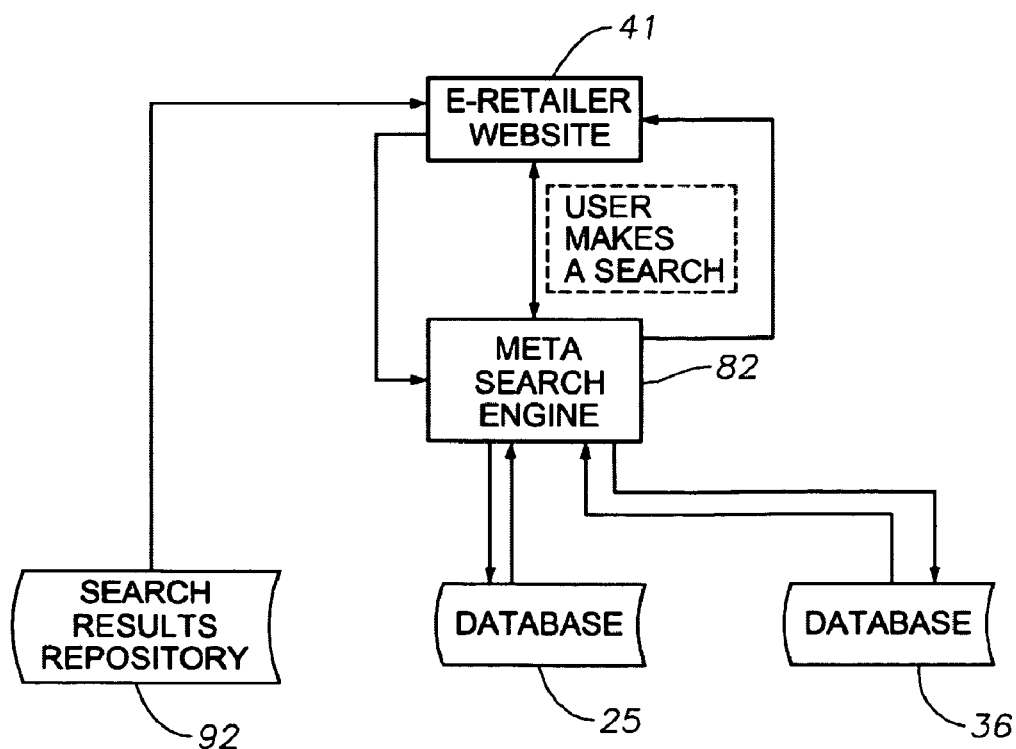
FIG. 10 is a schematic block diagram of a portion of a system for performing a guided navigational search over an electronic communication network according to an embodiment of the present invention.

The meta search engine 82 (see FIGS. 8-10) of the guided navigation program product 24 associated with an online retailer/wholesaler can incorporate the functionality of one or more commercially available search engines which are currently available to the user on the internet. Note, FIGS. 8-10 illustrate a high-level view of a representation of the system 20, 20' and program product 24 for performing a guided navigational search over an electronic communication network 30, according to various embodiments of the present invention.

The operations can also include, for example, the meta search engine 82 of the program product 24 producing a plurality of search results, for example, to potentially be displayed, e.g., at 48, on the search results content web page 40 (see, e.g., FIG. 4A) having preselected format, e.g., responsive to the initial search request; looking up or otherwise accessing and retrieving, for example, from database 36, general product attributes related to the returned plurality of search results; and sorting the general product attributes and the search results, e.g., based on data gathered on individual or traffic segment user behavior, or other website user interaction attributes stored, for example, in the website user interaction attributes database 25.

Figure 4A:
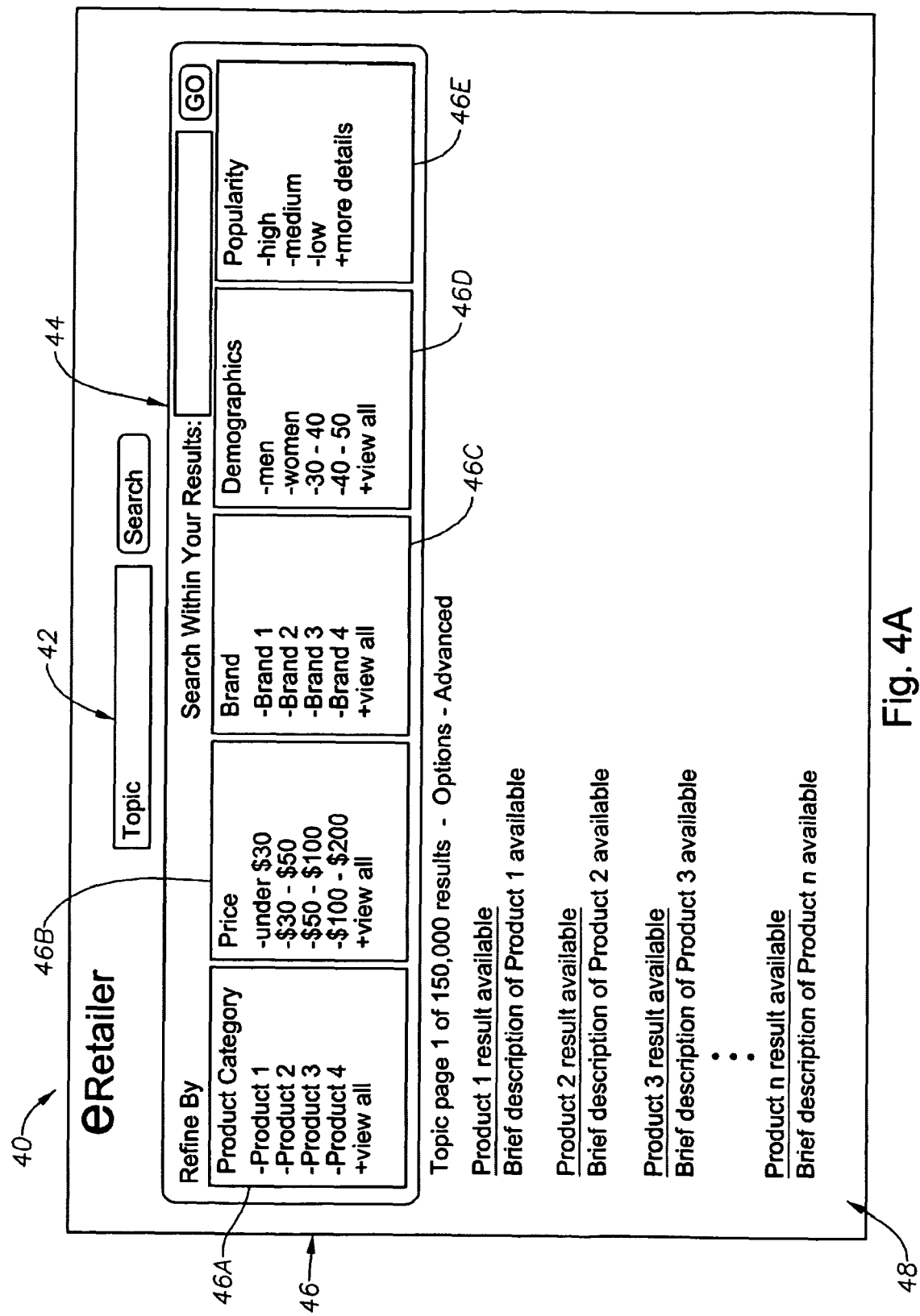
FIG. 4A is a schematic diagram of a user display including a guided navigation tool generated on an electronic retailer website after an initial search request according to an embodiment of the present invention.

As perhaps best shown in FIG. 4A, the operations can also include returning potential refined search results along with relevant product attributes for display on the user display 26 in search results content web page 40. The returned search results content web page 40 can include a refinement box, table, or chart having a plurality of user selectable refinement categories 46 arranged in a preselected pattern, e.g., organized by the relevant attributes, defining a guided navigation tool 44. The guided navigation tool 44 can be configured so that when a user selects a portion of the guided navigational tool 44 defining a refinement link, a user search is substantially more focused and thereby provides the user with significantly fewer search results within the refinement link than that generated without use of the navigational tool. For example, the preselected pattern of the guided navigation search tool 44 can include one or more rows and each of the plurality of user refinement categories defining a column can have a plurality of user-selectable subcategory rows as illustrated, for example, in FIGS. 4A-6. As understood by those skilled in the art, the portion of the guided navigational search tool 44 that a user selects can include either or both of the column and the subcategory row element within the guided navigational tool 44 so that the user search is substantially more focused and presented with significantly fewer search results than without use of the guided navigational tool.

The operations associated with the program product 24 can also include positioning in a preselected repository 92 (see FIGS. 9-10) and/or otherwise retaining or storing in memory, the plurality of search results defining predetermined search results and the relevant attributes, for example, so that subsequent search requests can access the preselected repository 92 of the plurality of predetermined search results prior to accessing the searchable databases.

The operations associated with the program product 24 can also include monitoring for user input in the form of a refinement click. If a refinement "click" or other type selection of a refinement link is received responsive to a user selecting a link within the attribute refinement categories 46, the process, for example, can append the search query and send the process back to the meta-search engine 82, or tell the meta-search engine to filter/organize the results according to the refinement selection (selected attribute) and to await additional refinement selection or selection of a search results item.

Figure 4B:
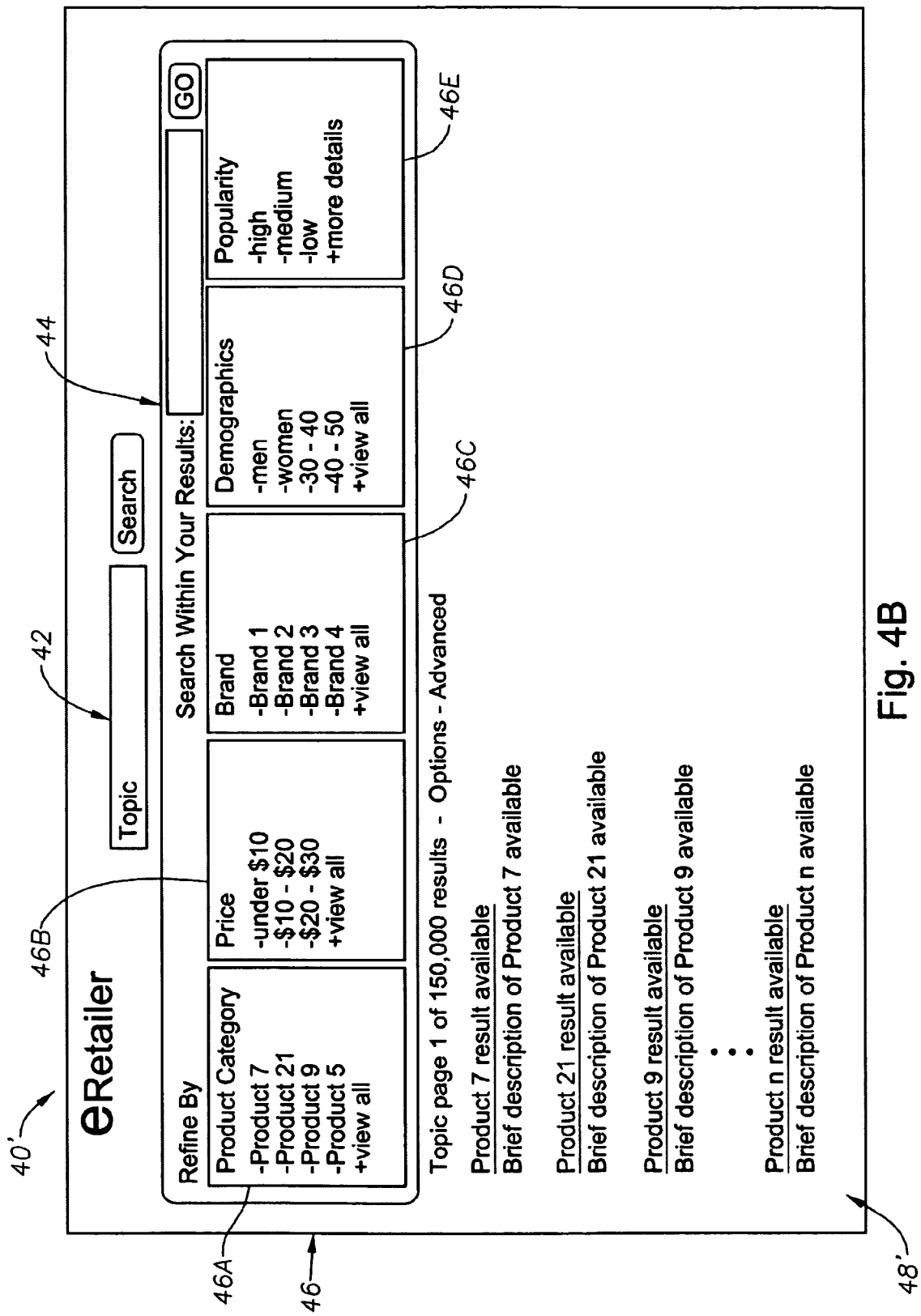
FIG. 4B is a schematic diagram of a user display including a guided navigation tool generated on an electronic retailer website after a refinement link is selected according to an embodiment of the present invention.

As perhaps best shown in FIG. 4B, the operations can also include generating an updated search results content page 40' including a plurality of user refined search results, shown at 48', for display on the display 26 of the one or more remote second computers 27. The updated second search results content page 48' can include a plurality of refinement categories 46, at least one of which can include a subcategory of the user selected refinement attribute. For example, a product refinement attribute such as, for example, "price under $30" can be subcategorized to "price under $10," price between "$10-$20," and price between "$20-$30," etc.

Figure 5:
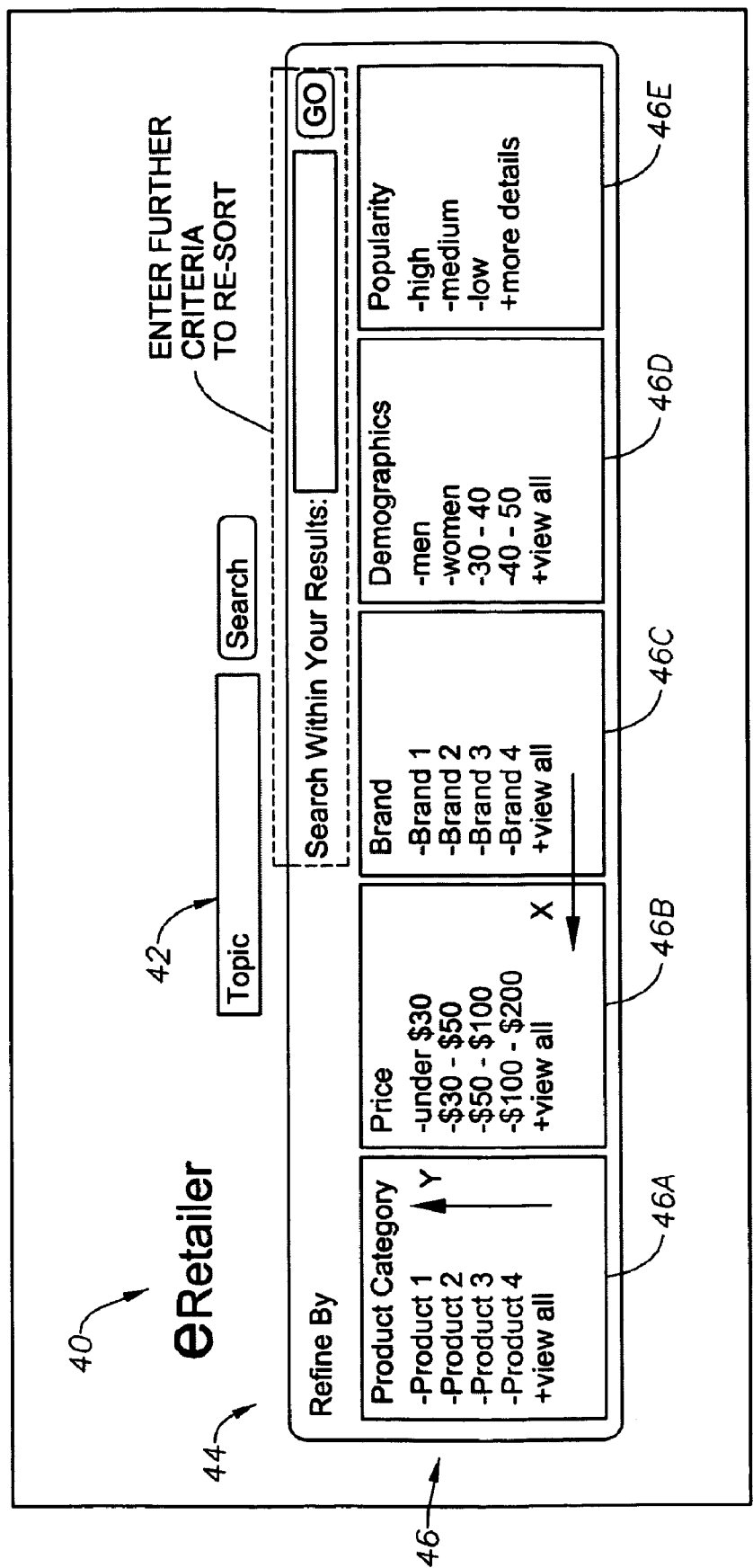
FIG. 5 is a schematic diagram of an embodiment of a guided navigational tool generated on a user display using a program product according to an embodiment of the present invention.
Figure 6:
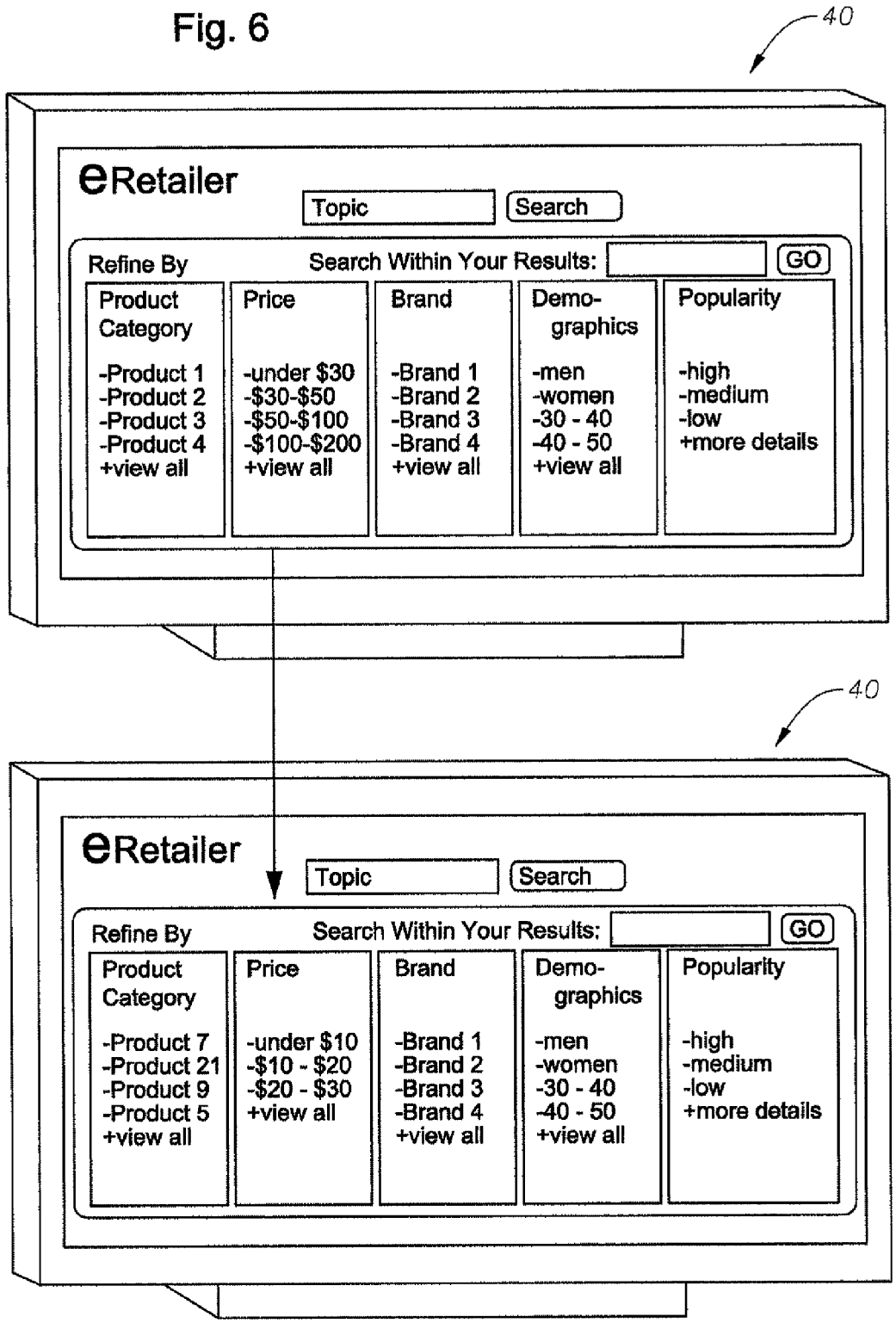
FIG. 6 is a schematic diagram of an embodiment of a guided navigational tool generated on a user display and a portion of the tool being enlarged upon selection by a user using a program product according to an embodiment of the present invention.

As perhaps best shown in FIG. 5, the operations can include pre-sorting and pre-ordering the user selectable refinement attributes (e.g., displayed refinement links) responsive to one or more examples of website user interaction attributes.

According to one exemplary configuration, the website user interaction attributes can include: frequency of selection of previous search results by one or more users of the internet defining clicks, frequency of sales of items from a website, amount of sales of items from a website, amount of profit from sales of items from a website, previous clicks of a user visiting a website, user's email address, user's geographic location, user's preferences, user's previous visits to a content page, and previous purchasing patterns of a user visiting a website, to thereby advance more relevant user selectable refinement attributes to a more visually optimal display position within the search results content page 40, 40', to thereby advance more relevant user selectable refinement attributes to a more visually optimal display position within the search results content page 40, 40'.

According to another exemplary configuration, various website user interaction attributes can be derived from a multidimensional matrix which accounts for common purchasing behavior among specific customer traffic segments or customer clusters, e.g., various traffic segment purchasing expectations based upon traffic segment classification, which are different than that of other specific customer traffic segments, and the current customer user lifecycle stage with the online e-commerce product provider for each specific user. Where merely providing a simple sort based on simple aggregate product metrics may at least partially work for some providers having a limited product line, and/or a limited customer base, such exemplary configuration, according to an embodiment of the present invention, can substantially improve search results, particularly where the online e-commerce product provider offers multiple disparate products to a wide variety of types of customers.

For example, according to such exemplary configuration, "units sold per day," "revenue dollars per day," and "profit dollars per day," or other relevant metrics directed to certain products, returned, for example, via an initial product search request, can be used to establish high similarity in purchasing behavior between categories of customer traffic segments.

The below matrix, for example, can be formed and used to establish a similarity in purchasing behavior for the "units sold per day" metric for a customer populace having two distinct categories of traffic segments, which can be the output of a model that weighs variables including, for example, products purchased, price points purchased, browsing and product refinement data (brands, colors, sizes, material, etc), product review data, demographic data (age, income, home value, geographic location, etc.).

Once the clusters of similar behavior are determined, the operations, for example, can include segmenting the product sales and sort the products available according to their performance with each traffic segment, for example, as shown below:

|    | Total units sold per day | Units sold to segment 1 | Units sold to segment 2 |
|----|--------------------------|-------------------------|-------------------------|
| P5 | 7                        | 3                       | 4                       |
| P4 | 2                        | 1                       | 1                       |
| P2 | 6                        | 2                       | 4                       |
| P1 | 4                        | 3                       | 1                       |
| P3 | 8                        | 5                       | 3                       |

Note, although illustrated as a table, various other computer-memory compatible configurations are within the scope of the present invention.

Responsive to information identifying aspects of the customer, e.g., a customer user's email address, a customer user's IP address, a customer user's web browser identification (identification via web browser cookies), a user's website membership account number, a customer user's geographic location, etc., the operations can further include dynamically identifying which traffic segment the respective customer is in and can change the returned sort list, accordingly. The table above yields an example tabular list for each traffic segment, shown below:

| Units sold to segment 1 | Units sold to segment 2 |
|-------------------------|-------------------------|
| P3                      | P5                      |
| P5                      | P2                      |
| P1                      | P3                      |
| P2                      | P1                      |
| P4                      | P4                      |

Other relevant metrics, such as, for example, "revenue dollars per day," and "profit dollars per day," to name a few, can also, or alternatively, the determined as a default.

Assuming the default metric to be "units sold," the program product 24 can provide instructions to either maintain or dynamically change the metric used to sort the product (here, "units sold") according to the level of engagement (customer lifecycle stage) of the respective customer with the respective e-commerce product provider. The customer "engagement level" or "lifecycle stage" can be defined, for example, by various attributes including the number of purchases the customer has made, the recency of the purchases, and/or the temporal time between purchases, along with others, described previously, such as, for example, the number of positive reviews given for products (those who give positive reviews are more likely to be loyal customers), number of negative reviews given for products (those who give negative reviews have a higher chance of not making additional purchases), and/or involvement in a community page for the online website, just to name a few.

An example of such dynamic implementation would be displaying the traffic segment #1 "units sold" sort to new customers categorized as falling within traffic segment #1, and the traffic segment #1 "revenue sort" to customers identified as being in the middle of their "lifecycle stage" who are categorized as falling within traffic segment #1.

Regardless of the implementation of the pre-sorting and/or pre-ordering, according to the exemplary embodiment, the visually optimal display position of the more relevant user selectable refinement attributes is typically the upper left portion of a table or results frame, i.e., the leftmost column, top most row, of the illustrated refinement box, table, or chart, for example, forming the guided navigation tool 44 having a plurality of user selectable refinement categories 46.

According to an embodiment of the present invention, the operations can further include assigning a higher relevancy value to one or more of the plurality of refinement attributes, such as, for example, to the refinement attribute associated with a user selected refinement link responsive to user selection thereof, e.g., for the specific user, so that when the same user or member of the same traffic segment returns to perform a similar or related search, the user is provided more relevant attributes relevant to the user. The operations can also or alternatively include assigning a higher relevancy value globally to the one or more refinement attributes for the traffic segment associated therewith.

According to an embodiment of the present invention, an embodiment of the program product 24, positioned within a system 20, 20', for example, can place or position a navigation box, table, or chart, including relevant refinement links, at the top or other visually ideal position within a web search results content page 40, 40', such as that of an e-commerce retailer, an online encyclopedia, a non-profit organization portal, or a web search engine, as displayed on a Web browser of a user's display 26 associated with their computer 27. This navigation box, table, or chart, as a type of guided navigation tool 44, allows the user to significantly narrow down the user's search request (see FIGS. 3-6). The guided navigational tool 44, for example, can be made up of about, e.g., five or so, different refinement categories 46 (see, e.g. FIGS. 4A-6) arranged in one or more rows, each defining a column having a plurality of user-selectable subcategory rows so that when a user selects a column and a subcategory row within the guided navigational tool 44, a user search is substantially more focused. Beneficially, such configuration assists the user in more quickly narrowing the search results to more specific user desired search results than would be generated without use of the guided navigational tool 44.

An example of refinement categories is illustrated in FIGS. 4A-6 by "product category" 46A, "price" 46B, "brand" 46C, "demographics" 46D, and "popularity" 46E. The refinement categories are not limited to these five examples illustrated in FIGS. 4A-6, as there can be a relatively infinite number of various refinement categories, depending upon the search term or terms used, but only a few of the plurality of refinement categories, such as most relevant five or six, are displayed to the user at any given time so as not to clutter a user display 26 or overwhelm a user. Within each refinement category can be a relatively infinite number of subcategory refinements, with the top five or six showing, for example, as well as a "view all" link, as understood by those skilled in the art, to allow a user to see an entire list (as user page space permits).

Various user interaction attributes can be tracked in terms of performance and the data stored. A type of data stored can be clicks, such as, for example, those made by an individual user or traffic segment, but such type of website user interaction attributes are not limited to "clicks." Regardless of the type or the methodology employed for tracking or otherwise obtaining them, the website user interaction attributes can be analyzed to optimize the relational position of the user selectable refinement links provided to the users associated with the one or more remote user computers 27 based on or responsive to this user interaction data. For example, as perhaps best shown in FIG. 5, more clicked on refinement categories by a collective group of users or an individual user can be correspondingly moved over to the left in the direction of the arrow X. More clicked on refinement attributes or links (row elements) can move upwards, or bottom to top, within their refinement category in the direction of the arrow Y. Functionally, the selected refinement attribute and refinement category carrying the selected refinement attribute can be separately assigned a comparatively higher relevancy value responsive to the user interaction data, which can then independently cause the movement of the relative position of the selected refinement attribute within the associated refinement category (Y arrow movement), the movement of the relative position of the refinement category associated with the selected refinement attribute (X arrow movement) or a combination thereof.

A goal, according to an embodiment of the present invention, is to "bubble" the most relevant refinements toward the upper left portion of the guided navigation tool 44—an "eye-catching" position of which has been found to be the position the "eye" of the purchasing user tends to first to look. Note, in this example, spatial positioning of the refinement attributes within guided navigation tool 44 were described with respect to "mouse clicks" or other selection of the attribute as presented in the form of a hyperlink. The refinements, however, need not be limited to sorting only by clicks. Rather, these refinements can be implemented by any piece of data desired to be tracked and stored.

As noted above, the refinement links representing the various product attributes and sub-attributes can be sorted and ordered responsive to the refinements. According to various embodiment of the present invention, the refinement data can come from a plurality of different data sources, for example:

Website attributes that can be created and stored by an online retail company.

Attributes of other web sites that are provided by partners of the online retail company.

User related data to populate refinements like "related searches" and "did you mean?" provided by either an online retail company or by its partners.

Natural search results provided by a search partner.

Image, video, audio, blog, map search options provided by either an online retailer or its partners.

Static attributes that simply append queries—such as limiting them to English.

The refinement data, such as, for example, the recorded or analyzed website user interaction attributes, can be stored, for example, attribute database 25, and, for example, in tabular form (see, e.g., table 54, 54', FIGS. 7A-7B) or other as understood by those skilled in the art. For example, five to ten columns of attributes can be collected. The number of products/search term rows and the number of attribute columns can grow over time as additional data is gathered.

According to an exemplary embodiment of the present invention, once a refinement click is made by the user, the search results can be filtered to only include products that have that attribute (or one or more attributes as pre-selected). As understood by those skilled in the art, the number and types of attributes: can be controlled or limited, can be pre-selected, can be added to or subtracted from, or can be relatively limitless, as desired, according to various embodiments of the present invention. Other attributes in one or more databases, for example, and as understood by those skilled in the art, can include related searches, location, website user's demographics, country, language, individual or traffic segment, spending habits, price grouping, quantity remaining, advertising or sales program classification, whether the product webpage contains video or image content, just to name a few.

Various embodiments of the present invention also include methods of facilitating a guided navigational search by one or more users of a corresponding one or more remote user computers in communication with an online retailer or wholesale services computer or server, e.g., search engine remote server 21, 21', or 31, through an electronic communication network, e.g., network 30, to include generating a guided navigational search tool (e.g., guided navigation tool 44) from and readable by the online retailer or wholesale services computer or server.

Figure 11:
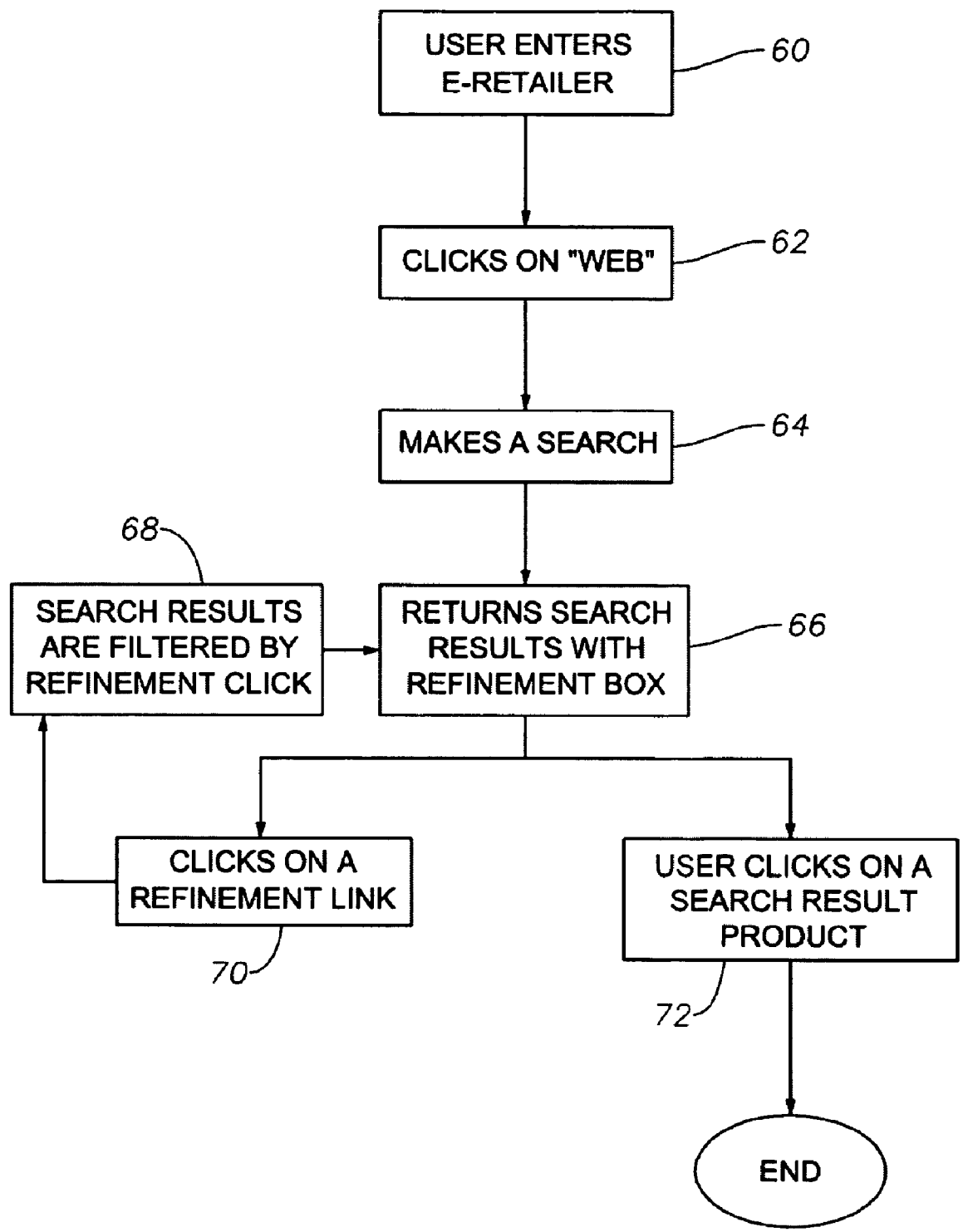
FIG. 11 is a schematic flow chart of a method of performing a guided navigational search by a user according to an embodiment of the present invention.

As perhaps best shown in FIG. 11, according to an embodiment of the present invention, such a method, for example, can include the step of a user entering a content page, e.g., E-retailer search request content page 28, etc., as viewed, for example, on a display 26 of one or more remote user computers 27 through the internet (block 60); initiating an initial search request, e.g., by clicking on a "Web" search to link (block 62); and making or performing a search using one or more search terms (block 64). The search can include use of a search engine that can directly or indirectly address one or more of the search engine remote servers 21, 21', 31, and database servers 35 having one or more searchable data, including computers or servers providing online access to retail or wholesale goods and/or services, associated with an online retail or wholesale website. The searchable databases can include a website user interaction attribute database 25 having a plurality of attributes (e.g. as described previously) stored, for example, in memory 24 of the search engine remote server 21, 21', and a product attribute database 36 stored in the memory of the database server or servers 35, related to the online retail/wholesale website.

The method can also include the step of returning search results responsive to the initial search request (block 66). The return search results can include a refinement box, table, or chart defining a guided navigation tool 44 providing a plurality of user selectable refinement categories 46, and optionally including paid advertisement listings. If the user clicks on a search result product (block 72), or clicks on a paid advertisement listings, or otherwise leaves the web site, this portion of the process ends. If the user clicks on a refinement link (block 70), the search results are filtered/reorganized according to the refinement selection (block 68), using a process such as, for example, that described previously.

According to an embodiment of the present invention, the above described methods can be performed using varying types of system and program product architecture. For example, as shown in one or more of FIGS. 8-10, graphical user interface can be provided to the one or more user computers 27 to thereby provide display of a web page 40 of an, e.g., e-retailer web site 41. A meta-search engine/front layer 82 can manage and/or access one or more attributes databases 25, 36, which can provide various categories 86 of attributes (e.g., those identified previously), demographic attributes 87, and/or manually inputted attributes 88, or others, for example, directly or through the attributes database 25 (see, e.g., FIG. 8), and can manage a search results repository 92. Beneficially, the meta-search engine 82 can manage the initial and focused searches, according to the various illustrated pathways shown in the respective figures, just to name a few. Additionally, the meta-search engine 82 can access one or more outside attributes databases (not shown), for example, directly or through the attributes database 25, or through the product attribute database 36.

Figure 12B:
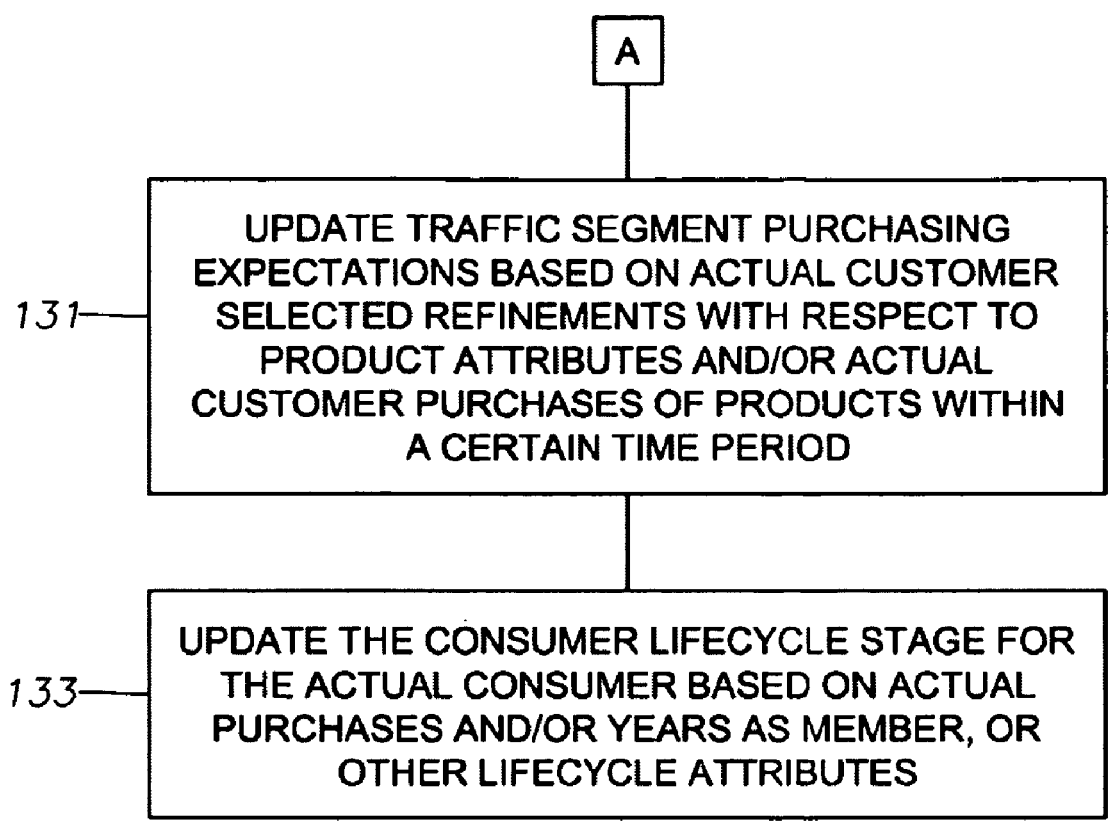

As perhaps best shown in FIGS. 12A-B, a method of generating a guided navigational search tool from and readable by a website computer (e.g., server 21, 21', 31) to facilitate a guided navigational search by one or more users of one or more remote user computers (e.g., user computers 27) in communication with the website computer through an electronic communication network (e.g., the internet), according to another embodiment of the present invention, is provided. The method can include the steps of receiving a search request from one or more remote user computers 27 for one or more search terms entered by a user on, e.g., a content page of a website having a preselected format and viewed on a display 26 of one or more remote user computers 27 (block 102), and initiating an initial search request (block 104), for example, through use of a search engine, whereby the search engine can address one or more of computers (e.g., computers 21, 21', 31, 35) and/or databases (e.g., databases 25, 36) having searchable data. Each of the computers and searchable databases is preferably in communication with website computer through the internet, which can be the Web or a world wide web of a plurality of computers in communication with one or more of the remote user computers.

The method can also include the steps of producing a plurality of search results (block 106) responsive to the initial search request (search query); looking up, determining, or otherwise accessing attributes related to the returned plurality of search results or search terms (block 108); returning all relevant attributes (block 110); sorting the attributes, e.g., based on data gathered on user behavior, using, for example, a meta-search engine (block 112); generating a user display of a plurality of potential refined search results including a plurality of user selectable refinement categories arranged in a preselected pattern defining a guided navigational tool 44 (e.g., output box/table/chart) (block 114); and returning the search results and sorted attributes to the website for display on the one or more user computers (block 116). Note, the step of sorting the attributes, e.g., based on data gathered on user behavior, and the step of generating a user display of a plurality of potential refined search results, can include, for example, application of a multi-dimensional matrix of consumer traffic segment expectations and consumer lifecycle stage, to various search result products and/or product attributes.

Beneficially, the guided navigation tool 44 can be configured so that when a user selects a portion of the guided navigational tool 44 defining a refinement link, a user search is substantially more focused and thereby provides the user with significantly fewer search results within the refinement link than that generated without use of the navigational tool. Particularly, according to an embodiment of the present invention, the guided navigation tool (user display) 44 (see, e.g., FIGS. 4A-6) can include, for example, a plurality of user selectable refinement categories 46 arranged in a pre-selected pattern so that, when a user selects a portion of the guided navigation tool 44, the user search is substantially more focused and thereby provides the user with significantly fewer search results than the results generated without use of the guided navigational tool.

As noted above, the pre-selected pattern of the guided navigation search tool 44 can include one or more rows with each of the plurality of user refinement categories defining a column having a plurality of user-selectable subcategory rows as illustrated (see FIGS. 4A-6). As understood by those skilled in the art, the portion of the guided navigational search tool 44 that a user selects can include either or both of the column and the subcategory row within the guided navigational tool so that a user search is substantially more focused and thereby provides the user with significantly fewer search results than the results generated without use of the guided navigational tool.

The method can also include the step of positioning in a preselected repository 92 and/or otherwise retaining or storing in memory, the plurality of search results defining predetermined search results and the relevant attributes (block 118), for example, so that subsequent search requests can access the pre-selected repository 92 of the plurality of predetermined search results prior to or in conjunction with accessing the searchable databases.

According to an embodiment of the method, if a refinement click is received via the user selecting a link within the attribute categories (block 120), the process, for example, can append the search query and send the process back to the meta-search engine, or tell the meta-search engine to filter the results by the selected attribute (block 121). Otherwise, the process, for example, can await selection of a displayed product or item or entry of one or more new search terms (block 122).

According to an embodiment of the method, the method can also include updating traffic segment purchasing expectations based on actual customer selected refinements with respect to product attributes and/or actual customer purchases of products within a certain time period (block 131), and updating the consumer lifecycle stage for the actual consumer based on actual purchases and/or years as member, or other lifecycle attributes, etc. (block 133).

It is important to note that while various embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the guided navigational search program product and the method steps, described above.

For example, a computer readable medium, according to an embodiment of the present invention, can contain program product stored therein that is readable by an e-commerce website computer (e.g., server 21, 21', 31) associated with an online retail or wholesale website featuring a plurality of goods, services, or goods and services, which functions to cause the website computer to perform operations to facilitate a guided navigational search by one or more users of one or more remote user computers (e.g. user computers 27) in communication with the website computer through an electronic communication network (e.g., network 30). Particularly, such computer readable medium and program product, for example, can include a set of instructions that, when executed by a computer, cause the computer to perform the operations of receiving a search request comprising one or more search terms through a communications network, initiating an initial user search request responsive to receipt of the one or more search terms, for example, by use of a one or more search engines configured to addresses one or more searchable databases. The searchable database or databases can include a website user interaction attribute database 25 having a plurality of attributes (e.g., such as those described previously) to be associated with the one or more search terms, products, or product attributes, to thereby sort and order the search results and/or displayed product attributes responsive to the plurality of website user interaction attributes. The searchable database or databases can also include a product attribute database 36 and a search results repository 92. The one or more search terms can be entered, for example, into a search request content page 28 (see, e.g., FIG. 3) by a user when the content page is displayed through the electronic communication network 30 to a user by a user's browser on a video display 26 associated with a remote user computer 27 in a preselected format.

The operations can also include producing a plurality of search results responsive to the search request, and optionally positioning the plurality of search results for each of one or more search requests in a pre-selected repository, which can contain the plurality of search results and a plurality of search request refinements (such as those described previously) so that subsequent search requests can access the pre-selected repository of the plurality of predetermined search results prior to accessing the searchable databases and so that more popular search requests take less time to receive the plurality of search results. A subsequent search request can, however, be first initiated to the searchable databases, for example, if one or more search terms have not been previously stored in the pre-selected repository, or if a pre-selected time threshold has been met since the last time that the one or more search terms have been previously searched.

The operations can also include generating a search results content page 40, accessing the search results, and causing or otherwise allowing display the search results content page 40 on a user display (e.g., video display 26 accessible by a user) with a plurality of potential refined search results responsive to the plurality of search results. The search results content page, according to an embodiment of the present invention, along with the potential refined search results, can include, for example, a plurality of user selectable refinement categories 46 arranged, e.g., in one or more rows with each of the plurality of user refinement categories 46 defining a column having a plurality of user-selectable subcategory rows (defining a guided navigational tool 44) so that when a user selects a column and a subcategory row within the guided navigational tool 44 (defining a plurality of user selectable refinement attributes), a user search is substantially more focused and thereby able to assist the user in more quickly narrowing the search results to more specific user desired search results than would be possible without use of such guided navigational tool.

The operations can further include appending the search request responsive to user selection of a user selectable refinement attribute and generating an updated search results content page 40' including a plurality of user refined search results 48' for display on the display 26 of the one or more remote second computers 27.

As understood by those skilled in the art, the initial search request can be initiated to the plurality of searchable databases 25, 36, either if one or more search terms have not been previously stored in the pre-selected repository 92 or if a pre-selected time threshold has been met since the last time that the one or more search terms have been previously searched in the plurality of searchable databases. Also, website user interaction refinements, for example, enabled by a website manager, can be used to initially refine the search results. The website user interaction refinements can include information representing at least portions of a traffic segment purchasing expectation matrix comprising a plurality of traffic segments referenced to a plurality of products, the information refined by a traffic segment purchasing expectation associated with a traffic segment classification for a specific user, and further refined by a user lifecycle stage with the e-commerce product provider for the specific user.

The attribute database 25 can further include one or more of the following: website attributes, image, video, audio, blog, map, and language, and the arranged row and columns of the guided navigational search tool can further define a table format displayed to a user on the one or more remote user computers. These attributes, for example, can include any additional (or alternative) attribute or any possible website or webpage characteristics. Many more attribute sources or databases, as understood by those skilled in the art, than specifically listed above can be used.

Further, the user selectable refinement attributes or "refinements" provided in the content page 40 can be initially sorted and ordered responsive to any one of the prior described website user interaction refinements, individually or in combination, but according to an exemplary configuration, the user selectable refinement attributes are sorted and ordered at least partially based upon clicks, sales, profits, visits to a content page, the user's email address, the user's IP address, web browser identification, or website membership account number, the user's geographic location, and/or the user's known preferences, for example.

Accordingly, the operations can also include sorting and ordering the displayed refinement attributes and refinement categories carrying the refinement attributes, for example, by assigning a comparatively higher relevancy value thereto which can then either independently or dependently cause the movement of the relative position of the various refinement attributes within the associated refinement category and/or the movement of the relative position of the various refinement categories, for example, according to the previously described process.

It should be understood that the various operating instructions described with respect to the exemplary embodiments of the present invention are not necessarily related to or required by a particular computer or other server hardware. Many of the operations performed by the various computers can be either consolidated or distributed differently than as described. Various conventional computers or servers can be used according to the exemplary embodiments of the present invention. Also, any process may be divided across multiple processors or computers. Further, these embodiments are not described with reference to any particular programming language, but rather, it will be understood by those skilled in the art that one or more of a variety of programming languages can be used to implement the systems, program products, and methods of embodiments of the present invention as described herein.

As illustrated in the drawings and as described herein, various embodiments of the present invention, for example, can advantageously provide systems, program products, and methods for performing electronic communication network guided navigation, which allow users to obtain more relevant search results much more quickly and which allow a user to enter or start a search request for a relatively broad term in a search engine and quickly start looking for relevant information, by assisting the user in a more efficient guided search. The results, for example, can be displayed to a user in a row of boxes, which focus the user on categories of potential intentions or meanings behind the search request term so that the user's intent can be quickly ascertained and the user directed to results more closely aligned with or coinciding with the user's intent underlying or behind the search request.

By providing a user revised search result selections in an organized and efficient format, various embodiments of the present invention can funnel or guide the search based on the user's perceived or potential intent. Further, various embodiments of the present invention can resultingly treat the refined result options just as importantly as the search results, themselves. This, in turn, can, for example, create less of an impediment for using an electronic communications network search, enhances user friendliness on a display, and significantly enhances the speed of retrieving a desired search result. The applications and use of the program product, for example, can not only include searching within an electronic commerce or e-commerce retailer website for goods or services to be purchased by a user, but also can include searching an online data source such as an online encyclopedia being open, e.g., Wikipedia, or closed, e.g., Encyclopedia Britannica, a non-profit or for-profit web portal allowing users to access information about an industry, an organization, or product/services related to a specific field.

Various embodiments of the present invention can be configured as a program product in which all or portions thereof are downloaded to or otherwise stored on a remote user computer as described herein. In arrangements where it is used both as an enhancement to a search engine or as a new search engine, and as an enhancement to searching within a website of an e-commerce retailer, an online portal, or an online data source, for example, users are not only able to find relevant e-commerce retailers, industry information, or information about an organization having desired search results, but can also locate refined or advanced results within a particular website located or accessed, thereby significantly enhancing the term search experience for the user.

As understood by those skilled in the art, according to an exemplary configuration, a metadata search engine or a meta-search engine can access one or more other search engines, e.g., through an icon or click through to the Web. The one or more search engines, e.g., four or five other search engines, cumulatively can provide results to a pre-selected repository in a computer or a pre-selected repository layer in a program product, as understood by those skilled in the art. The meta-search engine can assist in organizing the search responsive to a website attribute database that can periodically refresh the pre-selected repository with up to date search results over selectable periods of time. By providing a pre-selected repository arrangement, for example, the speed of the search results can be significantly increased and the volume of data, e.g., websites where relevant content may reside, to be handled more often, can be significantly reduced.

This application is related to U.S. Patent Application No. 61/048,285 filed on Apr. 28, 2008, titled "System, Program Product and Methods of Electronic Communication Network Guided Navigation," and U.S. Patent Application No. 61/017,500 filed on Dec. 28, 2007, titled "System, Program Product and Methods of Electronic Communication Network Guided Navigation," each incorporated herein by reference in its entirety.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A computer implemented method of facilitating a guided navigational search by one or more users of one or more remote user computers in communication with an online retail or wholesale store computer defining an online e-commerce computer associated with an online e-commerce product provider, through an electronic communication network, the method comprising the steps of:
   providing a product search request content page of an online e-commerce website having a pre-selected format, through the communication network, the product search request content page viewable on a display of one or more user computers and including fields for entering into the product search request content page product search request criteria comprising one or more search terms;
   initiating an initial product search request responsive to receipt of the one or more search terms from the one or more remote second computers;
   returning a plurality of product search results responsive to the initial product search request;
   accessing a plurality of general product attributes associated with the plurality of returned product search results;
   determining at least one website user interaction refinement associated with a specific customer user by the online e-commerce computer, the at least one website user interaction refinement based upon a customer user lifecycle stage with the e-commerce product provider for the specific customer user and a traffic segment purchasing expectation associated with a traffic segment classification associated with the specific customer user;
   sorting the returned product search results responsive to the at least one website user interaction refinement to thereby form a plurality of potential refined product search results; and
   generating a product search results content page including at least a subset of the plurality of potential refined product search results and at least a subset of the sorted plurality of general product attributes for display on a display of the one or more remote second computers responsive to the plurality of refined product search results and the associated general product attributes.

2. A method as defined in claim 1,
   wherein the step of determining at least one web site interaction refinement includes identifying the traffic segment classification associated with the specific customer user, the traffic segment purchasing expectation associated with the traffic segment classification associated with the specific customer user, and the customer user lifecycle stage with the e-commerce product provider for the specific customer user;
   wherein the step of sorting the returned product search results includes:
      sorting the returned product search results by at least one of a plurality of presentation metrics for each respective returned product, according to the traffic segment classification associated with the specific customer user, and
      returning the plurality of potential refined product search results sorted according to one of the plurality of presentation metrics, the one of the plurality of presentation metrics selected responsive to the customer user lifecycle stage with the e-commerce product provider for the specific customer.

3. A method as defined in claim 1,
wherein the product search results content page includes a plurality of refinement categories arranged in one or more rows; and
wherein each of the plurality of refinement categories define a column having a plurality of user-selectable subcategory rows so that when a user selects a column and a subcategory row a user search is substantially more focused and thereby assists the user in more quickly narrowing the product search results to more specific user desired product search results.

4. A method as defined in claim 1, wherein the product search results content page is a first product search results content page, and wherein the first product search results content page includes a plurality of refinement categories including the sorted plurality of general product attributes defining a plurality of user selectable refinements, arranged in a pre-selected pattern, the method further comprising the steps of:
appending the product search request responsive to user selection of a user selectable refinement; and
generating a second product search results content page defining an updated product search results content page including a plurality of user refined product search results for display on the display of the one or more remote second computers.

5. A method as defined in claim 4, further comprising the step of:
assigning a higher relevancy value to the user selected refinement responsive to customer user selection thereof; and
wherein the updated product search results content page includes a plurality of refinement categories, at least one of the plurality of refinement categories including a plurality of user selectable refinements subcategorizing attributes of the user selected refinement.

6. A method as defined in claim 4, further comprising the steps of:
globally assigning a higher relevancy value to the user selected refinement responsive to customer user selection thereof; and
updating the traffic segment purchasing expectation.

7. A method as defined in claim 1,
wherein the product search results content page includes a plurality of refinement categories comprising at least a portion of the sorted plurality of general product attributes defining a plurality of refinements;
wherein the plurality of refinements are sorted and ordered responsive to the at least one website user interaction refinement;
wherein attributes defining the customer user lifecycle stage include one or more of the following: general purchasing history with the e-commerce product provider, categorical purchasing history with the e-commerce product provider, recency of purchases, temporal timeline between purchases, length of affiliation with the e-commerce product provider, number of positive reviews given for products, number of negative reviews given for products, and involvement in a community page for the online e-commerce website, for the specific customer user;
wherein attributes defining the traffic segment purchasing expectation include one or more of the following: one or more demographic attributes of the traffic segment, a frequency of selection of previous product search results by one or more customer users or categories of customer users defining clicks, a frequency of sales of specific product items from an online website, price points purchased, an amount of sales of the specific items from an online website, an amount of profit from sales of the specific items from an online website, a number of previous clicks of a customer user visiting an online website, a customer user's email address, a customer user's IP address, a customer user's web browser identification, a customer user's website membership account number, a customer user's geographic location, one or more customer user's preferences, a customer user's previous purchasing patterns of visiting an online website, a customer user's previous visits to a content page, number of visits between purchases, number of visits before first purchase, time since last visit, average time spent on site, number of products detail views, additions to online shopping cart, number of visits with repeat view of same product, and number of contacts with customer service, a customer user's time zone, a customer user's language settings, a customer user's purchasing method preference, and a customer user's prior user selectable refinements; and
wherein the method further comprises the step of advancing at least one more relevant user selectable refinement to a more visually optimal display position within the product search results content page responsive to selection of a user selectable refinement by the customer user.

8. A method as defined in claim 1,
wherein the product search results content page includes a plurality of refinement categories arranged in a preselected pattern;
wherein each of the plurality of user refinement categories define a column having a plurality of user-selectable subcategory rows;
wherein each of the plurality of refinement categories include a plurality of refinement links, each refinement link associated with one of the general product attributes in the at least a subset of the sorted plurality of general product attributes;
wherein the plurality of refinement categories define a guided navigation tool configured so that when a user selects a portion of the guided navigational search tool, a user search is substantially more focused and thereby provided with significantly fewer product search results than the results generated without use of the guided navigational search tool;
wherein the guided navigational search tool can include one or more rows;
wherein the one or more rows and plurality of columns are arranged in the preselected pattern;
wherein the plurality of columns and the one or more rows of the guided navigational search tool can further define a table format displayed to a user on the one or more remote second computers; and
wherein a portion of the guided navigational search tool that a user selects can include either or both of a column and a subcategory row within the guided navigational tool so that when selected, a user search is substantially more focused and thereby able to provide the user with significantly fewer product search results than the results generated without use of the guided navigational tool.

9. A method as defined in claim 1, further comprising the step of:
positioning the plurality of product search results in a pre-selected repository to define a plurality of predetermined product search results so that subsequent product search requests access the pre-selected repository prior to accessing a searchable database including a plurality of product attributes;

wherein the step of initiating an initial product search request is initiated to a plurality of searchable databases if the one or more search terms have not been previously stored in the pre-selected repository, or if a pre-selected time threshold has been met since the last time that the one or more search terms have been previously searched in the plurality of searchable databases; and wherein the plurality of searchable databases includes a product attributes database containing the plurality of general product attributes associated with the one or more search terms to enhance search efficiency.

10. A method as defined in claim 9, further comprising the steps of:

aggregating predetermined product search results determined by one or more previous product search requests of a plurality of search engines having access to a plurality of computers and databases; and assessing the aggregated predetermined product search results to return the plurality of product search results.

11. A computer implemented method of facilitating a guided navigational search by one or more users of one or more remote user computers in communication with an online retail or wholesale store computer defining an online e-commerce computer associated with an online e-commerce product provider, through an electronic communication network, the method comprising the steps of:

receiving a product search request comprising one or more search terms;

generating a product search results content page including a plurality of potential refined product search results by the online e-commerce computer responsive to the product search request and at least one user interaction refinement, the product search results content page being accessible and readily viewable by a user and also including a plurality of user selectable refinement categories arranged in one or more rows and each of the plurality of user refinement categories defining a column having a plurality of user-selectable subcategory rows so that when a user selects a column and a subcategory row defining a user selectable refinement, a user search is substantially more focused and thereby assists the user in more quickly narrowing the product search results to more specific user desired product search results;

updating the product search results content page to include a plurality of user refined product search results responsive to user selection of the user selectable refinement;

assigning a higher relevancy value to one or more of the following: a user selected refinement category row element or a user selected refinement category column associated with the user selectable refinement responsive to user selection thereof; and responsive to the higher relevancy value, assigning an enhanced visual position within the product search results content page to the one or more of the following: a user selected refinement category row element or a user selected refinement category column associated with the user selectable refinement.

12. A method as defined in claim 11, wherein the at least one user interaction refinement includes information representing at least portions of a traffic segment purchasing expectation matrix comprising a plurality of traffic segments referenced to a plurality of products, the information refined by a traffic segment purchasing expectation associated with a traffic segment classification for a specific user, and further refined by a user lifecycle stage with the e-commerce product provider for the specific user.

13. A method as defined in claim 11, further comprising the steps of:

updating the traffic segment purchasing expectations responsive to at least one of the following: selection of a user selectable refinement by the specific user and an actual purchase of one or more products from the online e-commerce product provider within a preselected time period; and updating the consumer lifecycle stage for the specific user responsive to at least one of the following: an actual subsequent purchase of one or more products and additional time of user association with the e-commerce product provider.

14. Guided navigational search program product stored on a tangible computer medium, the guided navigational search program product including instructions that when executed by an online retail or wholesale store computer defining an online e-commerce computer associated with an online retail or wholesale website defining an online e-commerce website featuring a plurality of goods, services, or goods and services collectively defining products, cause the computer to perform operations to facilitate a guided navigational search by one or more users of one or more remote user computers in communication with the online e-commerce computer through an electronic communication network, the operations comprising:

receiving a product search request comprising one or more search terms;

providing data over the communication network to display a product search results content page on a remote user computer, the product search results content page including a plurality of potential refined product search results generated responsive to the one or more search terms and at least one website user interaction refinement associated therewith, and including a plurality of refinement categories each displaying a plurality of user selectable refinement links, each user selectable refinement link indicating an associated one of a plurality of user selectable refinements and positioned so that when a user selects one of the plurality of user selectable refinement links, a user search is substantially more focused and thereby assists the user in more quickly narrowing the product search results to more specific user desired product search results; and providing data over the communication network to update the product search results content page to include a plurality of user refined product search results responsive to user selection of one of the plurality of user selectable refinement links.

15. Program product as defined in claim 14, wherein the plurality of refinement categories are arranged in one or more rows; and wherein each of the plurality of refinement categories define a column having a plurality of user selectable subcategory rows, each user selectable subcategory row comprising one of the plurality of user selectable refinement links.

16. Program product as defined in claim 14, wherein the updated product search results content page includes a plurality of refinement categories, at least one of the plurality of refinement categories including a plurality of user selectable refinements subcategorizing attributes of the refinement attribute associated with the user selected refinement link.

17. Program product as defined in claim 14, wherein the operations further comprise:
   assigning a higher relevancy value to the user selectable refinement associated with the user selected refinement link responsive to user selection thereof; and
   assigning an enhanced visual position within the product search results content page to the user selectable refinement represented by the user selected refinement link responsive to the higher relevancy value.

18. Program product as defined in claim 14, wherein the operations further comprise:
   initiating an initial product search request responsive to receipt of the one or more search terms;
   returning a plurality of initial product search results responsive to the initial product search request;
   accessing a plurality of general product attributes associated with the plurality of returned product search results and the at least one website user interaction attribute; and
   sorting the plurality of general product attributes responsive to the at least one website user interaction refinement to thereby generate the displayed plurality of refinement categories and the plurality of potential refined product search results.

19. Program product as defined in claim 18,
   wherein the plurality of user selectable refinements comprise at least a portion of the sorted plurality of general product attributes; and
   wherein the plurality of potential refined product search results and the plurality of user selectable refinements are sorted and ordered for display on the product search results content page responsive to the at least one website user interaction refinement;
   wherein the at least one user interaction refinement includes information representing at least portions of a traffic segment purchasing expectation matrix comprising a plurality of traffic segments referenced to a plurality of products, the information refined by a traffic segment purchasing expectation associated with a traffic segment classification for a specific user, and further refined by a user lifecycle stage with the e-commerce product provider for the specific user;
   wherein attributes defining the user lifecycle stage include one or more of the following: general purchasing history with the e-commerce product provider, categorical purchasing history with the e-commerce product provider, recency of purchases, temporal timeline between purchases, length of affiliation with the e-commerce product provider, number of positive reviews given for products, number of negative reviews given for products, and involvement in a community page for the online e-commerce website, for the specific user;
   wherein attributes defining the traffic segment purchasing expectation include one or more of the following: one or more demographic attributes of the traffic segment, a frequency of selection of previous product search results by one or more users or categories of users defining clicks, a frequency of sales of specific product items from an online website, price points purchased, an amount of sales of the specific items from an online website, an amount of profit from sales of the specific items from an online website, a number of previous clicks of a user visiting an online website, a user's email address, a user's IP address, a user's web browser identification, a user's website membership account number, a user's geographic location, one or more user's preferences, a user's previous purchasing patterns of visiting an online website, a user's previous visits to a content page, number of visits between purchases, number of visits before first purchase, time since last visit, average time spent on site, number of products detail views, additions to online shopping cart, number of visits with repeat view of same product, and number of contacts with customer service, a user's time zone, a user's language settings, a user's purchasing method preference, and a user's prior user selectable refinements; and
   wherein the operations further comprise advancing at least one more relevant user selectable refinement to a more visually optimal display position within the product search results content page responsive to user selection of a user selectable refinement.

20. Program product as defined in claim 18, wherein the operations further comprise:
   positioning the plurality of product search results in a pre-selected repository to define a plurality of predetermined product search results so that subsequent product search requests access the pre-selected repository prior to accessing a searchable database including a plurality of product attributes;
   wherein the operation of initiating an initial product search request is initiated to a plurality of searchable databases if the one or more search terms have not been previously stored in the pre-selected repository, or if a pre-selected time threshold has been met since the last time that the one or more search terms have been previously searched in the plurality of searchable databases; and
   wherein the plurality of searchable databases includes a product attributes database containing the plurality of product attributes associated with the one or more search terms to enhance search efficiency.

21. Program product as defined in claim 14,
   wherein the plurality of refinement categories are arranged in a preselected pattern;
   wherein each of the plurality of refinement categories include a subset of the plurality of user selectable refinements; and
   wherein the plurality of refinement categories define a guided navigation tool configured so that when a user selects a portion of the guided navigational search tool defining at least one of the user selectable refinements, a user search is substantially more focused and thereby provided with significantly fewer product search results than the results generated without use of the guided navigational search tool.

22. Guided navigational search program product stored on a tangible computer medium, the guided navigational search program product including instructions that when executed by an online retail or wholesale store computer defining an online e-commerce computer associated with an online retail or wholesale website of an e-commerce product provider defining an online e-commerce website featuring a plurality of goods, services, or goods and services collectively defining products, cause the computer to perform operations to facilitate a guided navigational search by one or more users of one or more remote user computers in communication with the online e-commerce computer through an electronic communication network, the operations comprising:
   returning a plurality of product search results;
   identifying a customer user lifecycle stage with the e-commerce product provider for a specific customer user;
   selecting one of a plurality of presentation metrics responsive to the customer user lifecycle stage with the e-commerce product provider for the specific customer;

returning the plurality of potential refined product search results sorted according to the selected one of the plurality of presentation metrics; and generating a product search results content page including at least a subset of the plurality of potential refined product search results for display on a display of the one or more remote second computers.

23. Program product as defined in claim 22, wherein the operations further comprise:

identifying a traffic segment classification associated with the specific customer user, and a traffic segment purchasing expectation associated with the traffic segment classification associated with the specific customer user to thereby determine at least one website user interaction refinement; and sorting the returned product search results responsive to the at least one website user interaction refinement to thereby form a plurality of potential refined product search results, the operation of sorting the returned product search results including sorting the returned product search results by the at least one of the plurality of presentation metrics for each respective returned product according to the traffic segment classification associated with the specific customer user responsive to the traffic segment purchasing expectation associated with the specific customer user.

24. Guided navigational search program product stored on a tangible computer medium, the guided navigational search program product including instructions that when executed by an online retail or wholesale store computer defining an online e-commerce computer associated with an online retail or wholesale website of an e-commerce product provider defining an online e-commerce website featuring a plurality of goods, services, or goods and services collectively defining products, cause the computer to perform operations to facilitate a guided navigational search by one or more users of one or more remote user computers in communication with the online e-commerce computer through an electronic communication network, the operations comprising:

returning a plurality of product search results;

identifying a traffic segment classification associated with a specific customer user, and a traffic segment purchasing expectation associated with the traffic segment classification associated with the specific customer user;

sorting the returned product search results according to the traffic segment classification associated with the specific customer user responsive to the traffic segment purchasing expectation associated with the specific customer user to thereby return a plurality of potential refined product search results; and generating a product search results content page including at least a subset of the plurality of potential refined product search results for display on a display of the one or more remote second computers.

25. Program product as defined in claim 24, wherein the operations further comprise:

identifying a customer user lifecycle stage with the e-commerce product provider for the specific customer user;

selecting one of a plurality of presentation metrics responsive to the customer user lifecycle stage with the e-commerce product provider for the specific customer; and returning the plurality of potential refined product search results sorted according to the selected one of the plurality of presentation metrics.

26. A system for facilitating a guided navigational search by one or more users of one or more remote user computers in communication with an online retail or wholesale store computer defining an online e-commerce computer associated with an online e-commerce product provider through an electronic communication network, the system comprising:

a first computer;

one or more second computers positioned remote from the first computer and in communication with the first computer through an electronic communication network defining an internet;

guided navigational search program product stored on a tangible computer medium that is readable by the first computer to facilitate a guided navigational search by one or more users of the one or more remote second computers, the guided navigational search program product comprising a set of instructions that when executed by the first computer, causes the first computer to perform the following operations:

initiating an initial product search request as received from one or more remote second computers for one or more search terms, generating a product search results content page including a plurality of potential refined product search results responsive to either the plurality of product search results produced in response to the initial product search request and at least one website user interaction refinement or responsive to a plurality of predetermined product search results stored in a preselected repository, for display on a display of the one or more remote second computers in communication with the internet and being accessible by a user thereof, the product search results content page also including a plurality of user selectable refinement categories each displaying a plurality of user selectable refinement links and arranged in a pre-selected pattern defining a guided navigational tool so that when a user selects a portion of the guided navigational tool, a user search is substantially more focused and thereby assists the user in more quickly narrowing the product search results to more specific user desired product search results, and updating the product search results content page to include a plurality of user refined product search results responsive to user selection of a portion of the guided navigational tool.

27. A system as defined in claim 26, wherein the pre-selected pattern of the guided navigational search tool comprises one or more rows;

wherein each of the plurality of user refinement categories define a column having a plurality of user-selectable subcategory rows;

wherein the portion of the guided navigational search tool that a user selects comprises either a column or a subcategory row within the guided navigational tool so that when selected, a user search is substantially more focused and thereby provided with significantly fewer product search results than the results generated without use of the guided navigational tool;

wherein the operations further include receiving one or more search terms entered by a user onto a product search request content page as viewed on a display of one or more of the remote second computers through the internet and being displayed in a pre-selected format to a user on the display; and wherein the internet comprises a world wide web of a plurality of computers in communication with one or more of the remote second computers.

28. A system as defined in claim 27,
wherein the plurality of user-selectable subcategory rows are sorted and ordered responsive to one or more of the at least one website user interaction refinements; and
wherein the at least one user interaction refinement includes information representing at least portions of a traffic segment purchasing expectation matrix comprising a plurality of traffic segments referenced to a plurality of products, the information refined by a traffic segment purchasing expectation associated with a traffic segment classification for a specific user, and further refined by a user lifecycle stage with the e-commerce product provider for the specific user,
wherein attributes defining the user lifecycle stage include one or more of the following: general purchasing history with the e-commerce product provider, categorical purchasing history with the e-commerce product provider, recency of purchases, temporal timeline between purchases, length of affiliation with the e-commerce product provider, number of positive reviews given for products, number of negative given reviews for products, and involvement in a community page for the online e-commerce website, for the specific user;
wherein attributes defining the traffic segment purchasing expectation include one or more of the following: one or more demographic attributes of the traffic segment, a frequency of selection of previous product search results by one or more users or categories of users defining clicks, a frequency of sales of specific items from an online website, price points purchased an amount of sales of the specific items from an online website, an amount of profit from sales of the specific items from an online website, a number of previous clicks of a user visiting an online website, a user's email address, a user's IP address, a user's web browser identification, a user's website membership account number, a user's geographic location, one or more user's preferences, a user's previous purchasing patterns of visiting an online website, a user's previous visits to a content page, number of visits between purchases, number of visits before first purchase, time since last visit, average time spent on site, number of products detail views, additions to online shopping cart, number of visits with repeat view of same product, and number of contacts with customer service, a user's time zone, a user's language settings, a user's purchasing method preference, and a user's prior user selectable refinements; and
wherein the operations further comprise advancing at least one more relevant user selectable refinement to a more visually optimal display position within the product search results content page responsive to user selection of a user selectable refinement link.

29. A system as defined in claim 27,
wherein the system further comprises one or more searchable product databases in communication with the first computer;
wherein the operations include positioning the plurality of product search results in a pre-selected repository to define a plurality of predetermined product search results so that subsequent product search requests access the pre-selected repository of the plurality of predetermined product search results prior to accessing the one or more searchable product databases; and
wherein the product search request is initiated to the one or more searchable databases either if one or more search terms have not been previously stored in the pre-selected repository or if a pre-selected time threshold has been met since the last time that the one or more search terms have been previously searched in the one or more searchable product databases.

* * * * *